United States Patent
Chen et al.

(10) Patent No.: US 9,852,193 B2
(45) Date of Patent: Dec. 26, 2017

(54) PROBABILISTIC CLUSTERING OF AN ITEM

(75) Inventors: Ye Chen, Campbell, CA (US); John Canny, Berkeley, CA (US)

(73) Assignee: eBay Inc., San Jose, CA (US)

( * ) Notice: Subject to any disclaimer, the term of this patent is extended or adjusted under 35 U.S.C. 154(b) by 580 days.

(21) Appl. No.: 12/694,885

(22) Filed: Jan. 27, 2010

(65) Prior Publication Data

US 2011/0035379 A1 Feb. 10, 2011

Related U.S. Application Data

(60) Provisional application No. 61/232,683, filed on Aug. 10, 2009.

(51) Int. Cl.
G06F 17/30 (2006.01)
G06K 9/62 (2006.01)

(52) U.S. Cl.
CPC ..... *G06F 17/30536* (2013.01); *G06K 9/6226* (2013.01)

(58) Field of Classification Search
CPC ......... G06F 17/30705; G06F 17/30867; G06F 17/30864
USPC ............. 706/12; 707/758, 999.004, 999.006; 705/346
See application file for complete search history.

(56) References Cited

U.S. PATENT DOCUMENTS

| | | | |
|---|---|---|---|
| 2007/0208703 A1* | 9/2007 | Shi et al. | 707/3 |
| 2009/0171680 A1* | 7/2009 | Wiesinger | 705/1 |
| 2010/0268661 A1* | 10/2010 | Levy | G06Q 30/02 705/347 |
| 2011/0029464 A1* | 2/2011 | Zhang et al. | 706/12 |

FOREIGN PATENT DOCUMENTS

WO WO-2008133791 A2 11/2008

OTHER PUBLICATIONS

Andrew McCallum, Chris Pal, Greg Druck, and Xuerui Wang. 2006. Multi-conditional learning: generative/discriminative training for clustering and classification. In Proceedings of the 21st national conference on Artificial intelligence—vol. 1 (AAAI'06), Anthony Cohn (Ed.), vol. 1. AAAI Press 433-439.*

* cited by examiner

*Primary Examiner* — Son T Hoang
(74) *Attorney, Agent, or Firm* — Shook, Hardy & Bacon L.L.P.

(57) ABSTRACT

A clustering and recommendation machine determines that an item is included in a cluster of items. The machine accesses item data descriptive of the item. The machine accesses a vector that represents the cluster and calculates the likelihood that the item is included in the cluster, based on the item variable and the probability parameter. The machine determines that the item is included in the cluster, based on the likelihood. The machine also recommends an item to a potential buyer. The machine accesses behavior data that represents a first event type pertinent to a first cluster of items. The machine calculates a probability that a second event type pertaining to a second cluster of items will co-occur with the first event type. The machine identifies an item from the second cluster to be recommended and presents a recommendation of the item to the potential buyer.

17 Claims, 13 Drawing Sheets

PROBABILISTIC CLUSTERING OF AN ITEM

CROSS-REFERENCE TO RELATED APPLICATIONS

This application claims the priority benefit of U.S. Provisional Patent Application No. 61/232,683, filed Aug. 10, 2009 and entitled "METHOD AND SYSTEM FOR RECOMMENDING VOLATILE ITEMS," which is incorporated herein by reference in its entirety.

TECHNICAL FIELD

The subject matter disclosed herein generally relates to the processing of data. Specifically, the present disclosure addresses systems and methods involving probabilistic clustering of an item.

BACKGROUND

It is known that a machine may be used to facilitate a presentation of an item as recommended for consideration by a user. A web server machine may cause an electronic storefront to be displayed to the user, and the electronic storefront may include a presentation of a recommended item. For example, the web server machine may transmit data describing the recommended item to a web client machine of the user, and the web client machine may use the data to present the item using the electronic storefront.

Moreover, a machine may be used to facilitate the identification of the item. As example, an identification machine may access a user profile database containing a preference profile for the user, as well as an item inventory database of available items. The preference profile may contain a list of items desired by the user, as reported by the user to the identification machine. Based on the user's preference profile, the identification machine may select one of the available items for recommendation to the user.

BRIEF DESCRIPTION OF THE DRAWINGS

Some embodiments are illustrated by way of example and not limitation in the figures of the accompanying drawings in which.

DETAILED DESCRIPTION

Figure 1:
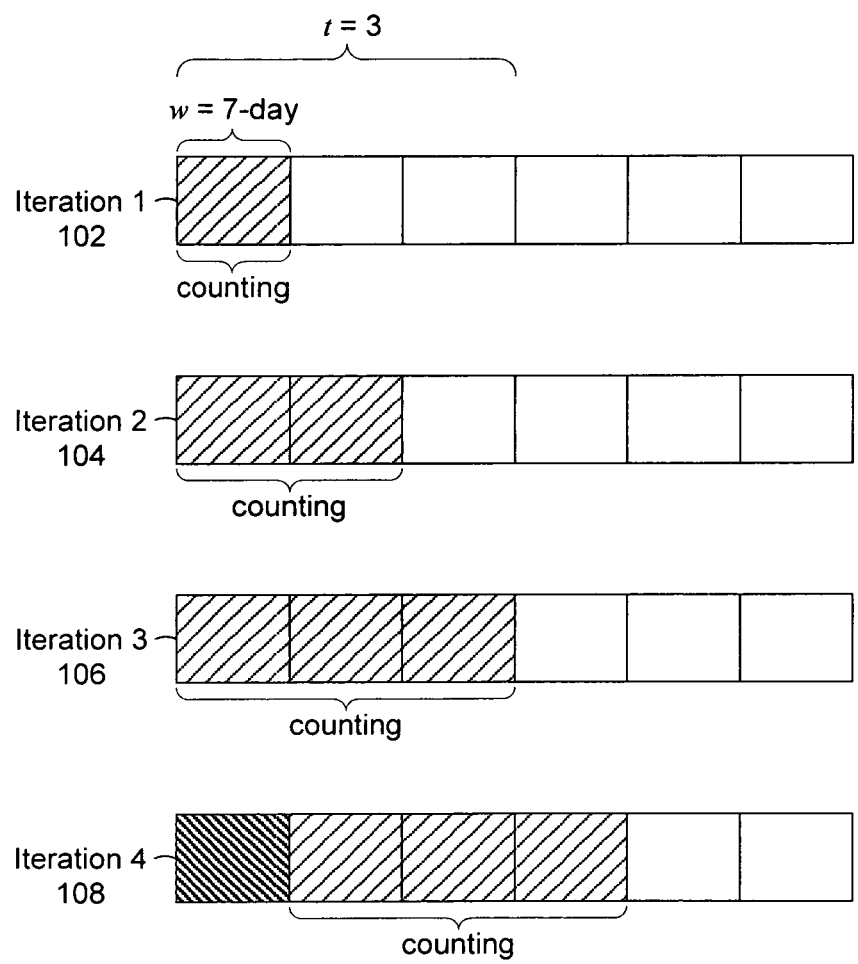
FIG. 1 is a diagram of a t×w sliding window, according to some example embodiments.

Example methods and systems are directed to probabilistic clustering of an item. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In various online marketplaces, an item available for sale may be available only temporarily. The item may be unique (e.g., one-of-a-kind), and a buyer may purchase the item at any time, thus removing the item from the item inventory of the marketplace, possibly forever. Accordingly, the availability of the item is unstable or, stated differently, "volatile." As used herein, a "volatile item" is a unique item or an item treated as unique within an item inventory (e.g., for purposes of an online marketplace), whether or not the item is actually unique.

Moreover, in the online marketplace, the item may be associated with a corresponding description that is free-form or, stated differently, "unstructured." An unstructured description is a description that may contain any kind of information (e.g., manufacturer, model, features, price, size, color, age, history, defects, or suggested purpose). For example, an unstructured description may be a free-form field of text, numbers, or both. In contrast, a structured description is limited to a defined set of information (e.g., a hierarchy of categories, a list of colors, or range of sizes) supported by the online marketplace. As used herein, an "unstructured item" is an item that has an unstructured description.

Introduction

Recommendation of volatile items may be facilitated by projection of the volatile items into a space of persistent latent products. Discussed herein is a generative clustering model for collections of unstructured and heterogeneous item data, where each item is a specimen of a latent product, and the latent product is represented by a cluster centroid. An item may be represented as a vector of independent and distinctly distributed variables, while a latent product may be characterized as a vector of probability distributions. The probability distributions may be chosen to be natural stochastic models for different types of data. The clustering model may enable machine learning, with the learning objective being to maximize the total intra-cluster coherence measured by the sum of log likelihoods of items under such a generative process.

Given a latent space of hidden products (e.g., centroids of clusters of volatile items), recommendations may be derived by using a naïve Bayes classifier for ranking items based on historical data of transactions or behaviors (e.g., sequential transactions or behaviors). Item-based recommendations may be generated by inferring latent products from items previously unseen. In particular, discussed herein is a principled scoring function for recommended items, which takes into account item-product membership, product purchase probability given historical transactions, and an auction-end-time factor. This may constitute a holistic probabilistic measure of a prospective item purchase that may facilitate increased item sales or revenue, as well as subjective user satisfaction with respect to identifying desirable items.

Also discussed herein is an evaluation of latent product clustering and recommendation ranking models, using real-world e-commerce data from eBay, in both offline simulation and online testing (e.g., alpha testing). In recent testing, a test system yielded significant improvements over an existing production system with respect to click-through counts, purchase-through counts, and gross merchandising value. An example embodiment may provide a practical yet principled framework for recommendation of items in domains with affluent user self-input data.

Recommending items in an online marketplace (e.g., eBay) may involve addressing one or more characteristic issues. One issue is structural in nature. A majority of items are ad hoc listings not covered by any predefined product or catalog taxonomy. This may be partially attributable to the nature of the inventory, which features a very long tail of item types and, not uncommonly, "one-of-a-kind" items in the inventory. Maintaining a catalog able to represent a highly dynamic and diverse inventory may be a daunting task. According to some example embodiments, however, such a catalog may be generated by deliberately reducing volatile and noisy item data to persistent and robust latent products. The latent products reveal a statistical structure underlying the item data, and may not necessarily correspond to physical products. This projection space may be optimized for effectiveness of recommendation or other information retrieval and filtering tasks.

Another issue is a sparsity of data. Historical transaction data at the user level is very sparse in an online marketplace. For example, over a three-month period of time at eBay, each buyer on average made 17.31 bids and won 5.63 of them. Publicized data from Netflix regarding user-movie ratings, on the other hand, indicate 208.33 ratings on average for each user. By comparison, the eBay data is more than 30-fold sparser for purchases and 10-fold sparser for bids. Since purchases reflect monetary commitments, historical purchases may be at least no worse than rating-based collaborative filtering (CF) data. However, given the sparsity of historical transactions or bid attempts, certain CF approaches may not be directly applicable or may not work as well as the generative clustering model discussed herein. From a data perspective, it may be helpful to incorporate implicit preference data, such as search queries, search results, item views, personalized saved searches and tracked items, bids, and purchases. From a method perspective, a naïve Bayes classifier may be applied to recognize co-preference or sequential-preference patterns. The compactness of a naïve Bayes classifier may be useful in processing a sparse and noisy data set, and may provide a probabilistic preference score for each candidate item. Recommendations may be made from the candidate items, and the recommendations may be enhanced by ranking and filtering the candidate items.

From Items to Products

Deriving robust product descriptions from item descriptions may facilitate subsequent delivery of item recommendations (e.g., auction suggestions). Since most items are treated as unique, certain modeling methods cannot be directly applied to user behavior, since there is no correlation between the user behavior and similar items. For example, an item may be described by approximately 10 title words, as well as one or more attribute values, a leaf category, and behavioral data such as user views, bids, and purchases. It may be useful, therefore, to map each item (e.g., each item identifier or item ID) to a more general product (e.g., a product identifier or product ID), for example, to derive a map F: I→P, where I is the space of possible item features, and P is the set of product labels. The resulting mapping operation is accordingly a clustering operation. In many similar situations, such as recommendations of books or movies, targeted advertising, or text clustering, a projection map G would be applied from I to a lower dimensional space before clustering is applied. However, it is also possible to apply model-based clustering directly to the item data, such as a "bag-of-words" feature vector for title text. Three example reasons for doing so are as follows:

As one reason, title descriptions for items are extremely sparse, having only approximately 10 terms on average. By contrast, movie data, texts for document clustering, and user histories for ad targeting have hundreds or thousands of events. These events are highly correlated (e.g., users have similar ratings of similar movies) and projection serves to normalize dependencies (e.g., singular value decomposition (SVD) creates a spherical Gaussian distribution in a low-dimensional space) and to robustly estimate the coordinates in the projection space. For such an estimate to be accurate, the number of parameters in a typical record should be much larger than the dimension of the projection space. In the examples above, a good ratio of data parameters to dimension is 10:1. If the projection space dimension is too high, there is little to no value in performing the projection step. Variances are normalized, but this could equally well be achieved by normalizing one or more metrics used in the original space. However, no "cleaning" of the data is accomplished in such a projection. In practice, system performance may become very poor as the projection dimension approaches the number of item parameters, in the examples above.

In the case of eBay items, the typical number of non-zero parameters is approximately 10. An ideal projection space would have a dimension $\frac{1}{10}$ of this, but it may not be useful to project items down to one dimension (1D). Projecting items into a higher-dimensional space is possible, but this would be an injection which would simply change the metric properties of the space, and no cleaning would be accomplished.

As another reason, the statistical dependencies among title words in eBay items are very different from the other examples above. In the first place, they are already quite independent. Users consciously try to describe the important features of their items in relatively few words. In many cases, words are genuine attributes or product category names. The dependencies that remain are highly localized and product specific. For instance, the term "red" has a high co-occurrence with products that come in a red version (e.g., iPods), but zero co-occurrence with products not available in red (e.g., iPhones). Other attributes have similar properties. Thus, for eBay items, dependencies are local in the product space, and it may not be useful to look for a global map from the title word space to a latent space. This situation differs from the other examples above where there are global dependencies based on user preference for document topic.

As a further reason, by using a generative clustering method, it is possible to accurately model these dependencies in their original parameter space. This opportunity may be lost after a global projection. Early experiments with generative clustering are very promising. Using a target cluster size of 10 on data in the category of "Electronics," a test system achieved high-quality clusters of relatively consistent size. The method described herein is scalable to at least several million items on a single machine.

Interchangeable Terms

One form of noise in item titles is aliases or alternative spellings. For example, "iPhone" may also occur as "i-Phone." A battery charger may be described as a "charger" or an "adapter" or an "AC adapter." In recommending items, it may be helpful to use canonical descriptors for such terms (e.g., to pick one member of a class as a representative and map other members to it).

Another anomaly, in some clusters, is the occurrence of different accessories for the same item (e.g., cases and chargers for the same product). The descriptors of these items match well, because they come from the shared parent product. In recommending items, however, it may be helpful to distinguish one accessory from another accessory.

In both of the above situations, the terms of interest are "interchangeable;" that is to say, they occur in similar contexts. As used herein, a "context" is defined as the set of all terms occurring in titles containing the target term. Interchangeable items may be identified using the following method. A system (e.g., a computer system with a hardware module) selects a subset of common terms (e.g., the 1000 most common terms). The system computes their contexts as the set of all co-occurring terms. Each context is normalized, by the system, to a vector of probabilities $p_{ab}$ such that $p_{ab}$ is the probability that term b occurs in a title containing the term a. The system computes a distance (e.g., a symmetrized Kullback-Leibler divergence (KL-divergence)) between all pairs of contexts. This gives, for each term, the most likely co-terms, along with their probabilities of co-occurrence. The system trims this list to the top few co-terms per term. The system presents the list for human editing to determine whether the co-terms are aliases or accessories of the same product.

Where co-terms are aliases of the same product, the system implements a replacement rule that replaces the co-terms with the main term (e.g., the lead term). Where co-terms are accessories of the same product, the system adds a prior probability distribution (e.g., "a prior") on their probabilities in each cluster which favors a zero or one value (e.g., Beta (0.5, 0.5)). These two operations are complementary. The first operation ensures that only one term (e.g., the main term) is used for an item that has several aliases, whereby it is safe to assert that the main term should appear in every cluster that refers to that product. That is, it is safe to assert that the probability of the main term should be 1.

Additionally, n-gram substitution may be employed by the system (e.g., to substitute "charger" for "AC adapter"). A number of attribute and product descriptors in the data are bi-grams or tri-grams. These may be handled in similar fashion to single terms.

A Latent Product Model: Generative Clustering

Described herein is a generative model for machine-based learning of latent products. An item x is the basic unit of transaction, embodied by a set of unstructured and heterogeneous data, which may include, without limitation, a title (e.g., an auction title), a description, an attribute name-value pair (e.g., an attribute name and an associated attribute value), or a price. The item data may be categorized into one of three types: (1) binary variables for term occurrences in textual data (e.g., a title or a description), which may be represented as $b=(b_1, b_2, \ldots, b_v)$, where V is the size of a vocabulary; (2) categorical variables for indexed attribute values (e.g., brand or color), which may be represented as $c=(c_1, c_2, \ldots c_U)$, where U is the number of attributes; and (3) continuous variables for numerical data (e.g., price), which may be represented as $g=(g_1, g_2, \ldots, g_S)$, where S is the dimension of a numerical feature space. A dense representation of an item thus becomes a 3-tuple of factors: $x=(b, c, g)$.

A latent product z is the persistent concept underlying one or more items. The latent product model uses a binomial distribution Binom(p) to model each binary variable, a multinomial distribution Mult($\theta$) for each categorical variable, and a Gaussian distribution $\mathcal{N}(\mu, \sigma^2)$ for each continuous variable, possibly after log transformation in some example embodiments. Certain example embodiments allow only one trial for each binomial and multinomial process per item (e.g., Bernoulli and categorical distributions, respectively). The one-trial specialization may be appropriate for the item data. Sellers tend to use concise descriptions for listing items, which may support an assumption that repeated terms are less relevant. Values of a categorical attribute tend to be mutually exclusive, which may support an assumption that an item has exactly one value. Another assumption used in various example embodiments is to assume the variance $\sigma^2$ of a continuous variable is a constant with respect to a collection of items. A latent product is thus represented as a vector of Bernoulli success probabilities, multinomial parameters, and Gaussian means: $z=(p_1, p_2, \ldots, p_v, \theta_1, \theta_2, \ldots \theta_U, \mu_1, \mu_2, \ldots, \mu_S)$.

The belongingness of an item to a latent product is stochastically modeled as the following generative process:
1. For binary variables: $b_v \sim \text{Binom}(p_v)$, $\forall v \in \{1, \ldots, V\}$;
2. For categorical variables: $c_u \sim \text{Mult}(\theta_u)$, $\forall u \in \{1, \ldots, U\}$;
3. For continuous variables: $g_s \sim \mathcal{N}(\mu_s, \sigma^2)$, $\forall s \in \{1, \ldots S\}$.

Given a latent product $z_k$, the likelihood of an item $x_i$ is:

$$p(x_i | z_k) = \prod_{v:b_{iv}=1} p_{kv} \prod_{v:b_{iv}=0} (1-p_{kv}) \prod_u \theta_{ku} \times \prod_s \frac{1}{\sigma\sqrt{2\pi}} \exp\left(-\frac{(g_{is}-\mu_{ks})^2}{2\sigma^2}\right),$$

where $\theta_{ku}$ is the multinomial probability corresponding to the outcome $c_{iu}$. The log likelihood is then:

$$l(x_i | z_k) = \sum_{v:b_{iv}=1} \log(p_{kv}) + \sum_{v:b_{iv}=0} \log(1-p_{kv}) + \sum_u \log(\theta_{ku}) - \sum_s \frac{(g_{is}-\mu_{ks})^2}{2\sigma^2} - \sum_s \log(\sigma\sqrt{2\pi}).$$

Parameter Estimation

Given a set of items $D=\{x_i\}_{i=1}^n$, it is possible to learn a smaller set of latent products $L=\{z_k\}_{k=1}^m$ and derive assignments of items $x_i$ to latent products $z_k$ with maximum likelihoods, such that the total intra-product log likelihood of the item data D is maximized, for example:

$$(z_1^*, \ldots, z_m^*) = \operatorname*{argmax}_{(z_1,\ldots,z_m)} \sum_k \sum_i \gamma_{ik} l(x_i \mid z_k),$$

where $\gamma_{ik}$ is an indicator variable for item-product membership.

The latent product vectors $(z_1, \ldots, z_m)$ are the only model parameters to be estimated, while $\gamma_{ik}$ can be viewed as hidden variables. The hard product membership assumption directly yields the maximum likelihood estimate (MLE) of $\gamma_{ik}$ with $z_k \forall k$ fixed. Since the latent product model uses binomial, multinomial, and Gaussian distributions to model item generation, the MLE of the latent product parameters $z_k$ are simply given by the means of the item random vectors belonging to that product. Thus, an example embodiment may use the following expectation maximization (EM) algorithm:

$$E\text{-step: } \gamma_{ik} \leftarrow \begin{cases} 1 & k = \operatorname*{argmax}_{k'} l(x_i \mid z_{k'}), \\ 0 & \text{otherwise.} \end{cases}$$

$$M\text{-step: } z_k \leftarrow E(x_i \mid \gamma_{ik} = 1).$$

In a standard EM algorithm, the E-step would compute the expectation of hidden variables. In some example embodiments, however, the expected value of $\gamma_{ik}$ is deterministically given by its MLE.

The initialization of $(z_1, \ldots, z_m)$ is obtained by first uniformly randomly sampling m groups of items and then performing an M-step, assuming that these groups represent m latent products, respectively. To address the sparsity and possible noise of such initialization, some example embodiments further smooth the local parameters $z_k$ by the background probabilities q:

$$z_k \leftarrow (1-\lambda)z_k + \lambda q,$$

where the background probabilities q is obtained by performing an M-step, assuming that the entire set of items is generated from a single global latent product, and $\lambda$ is the smoothing factor with a relatively small value (e.g., $\lambda$=0.01). Certain example embodiments perform smoothing after each iteration of EM for the same reason.

Efficient Inference

The task of inference, given a trained model, is to assign an item previously unseen (e.g., an unseen item) x' to a derived latent product with maximum log likelihood:

$$k^* = \operatorname*{argmax}_k l(x' \mid z_k),$$

which is identical to a final E-step. The same calculation (e.g., E-step) may be performed iteratively during clustering, and dominates the run-time of training with the complexity of $\mathcal{O}(nmV)$ for a naïve dense implementation. Accordingly, an efficient method to evaluate the log likelihood $l(x_i|z_k)$ may improve performance in certain example embodiments. For clarity, the following discussion focuses on an example method that only uses the Bernoulli terms, which are very numerous and sparse. According to various example embodiments, however, the method may encompass Bernoulli terms, multinomial scores, Gaussian scores, or any suitable combination thereof. Some example embodiments only involve a few multinomial and Gaussian parameters, which may be assumed to be dense. The simplified score is:

$$l(x_i \mid z_k) = \sum_{v:b_{iv}=1} \log(p_{kv}) + \sum_{v:b_{iv}=0} \log(1 - p_{kv}),$$

which after smoothing becomes $$l(x_i \mid z_k) = \sum_{v:b_{iv}=1} \log((1-\lambda)p_{kv} + \lambda q_v) + \sum_{v:b_{iv}=0} \log(1 - (1-\lambda)p_{kv} - \lambda q_v),$$

which can be further split according to whether $p_{kv}$ is zero or not:

$$l(x_i \mid z_k) = \sum_{v:p_{kv}>0, b_{iv}=1} \log((1-\lambda)p_{kv} + \lambda q_v) + \sum_{v:p_{kv}>0, b_{iv}=0} \log(1 - (1-\lambda)p_{kv} - \lambda q_v) + \sum_{v:p_{kv}=0, b_{iv}=1} \log(\lambda q_v) + \sum_{v:p_{kv}=0, b_{iv}=0} \log(1 - \lambda q_v).$$

Defining $p_a = (1-\lambda)p_{kv} + \lambda q_v$ and $p_b = \lambda q_v$, the above simplifies to $$l(x_i \mid z_k) = \sum_{v:p_{kv}>0, b_{iv}=1} \log(p_a) + \sum_{v:p_{kv}>0, b_{iv}=0} \log(1 - p_a) + \sum_{v:p_{kv}>0, b_{iv}=1} \log(p_b) + \sum_{v:p_{kv}>0, b_{iv}=0} \log(1 - p_b),$$

which can be rewritten $$l(x_i \mid z_k) = \sum_{v:p_{kv}>0, b_{iv}=1} \log\left(\frac{p_a}{1-p_a}\right) + \sum_{v:p_{kv}>0} \log(1 - p_a) + \sum_{v:p_{kv}=0, b_{iv}=1} \log\left(\frac{p_b}{1-p_b}\right) + \sum_{v:p_{kv}=0} \log(1 - p_b).$$

Some example embodiments extend this idea further and rewrite the above as:

$$l(x_i \mid z_k) = \sum_{v:p_{kv}>0, b_{iv}=1} \log\left(\frac{p_a(1-p_b)}{(1-p_a)p_b}\right) + \sum_{v:p_{kv}>0} \log\left(\frac{1-p_a}{1-p_b}\right) + \sum_v \log(1-p_b) + \sum_{v:b_{iv}=1} \log\left(\frac{p_b}{1-p_b}\right).$$

Of the four right-hand side terms, only the first term depends on both the cluster k and the item i. It comprises only terms which are shared between both the item and the non-zero components of $p_{kv}$. By pre-computing the sparse vectors $a_{kv} = (\log(p_a) - \log(1-p_a) - \log(p_b) + \log(1-p_b))$ only at non-zeros of $p_{kv}$, example embodiments are able to evaluate this first sum with a sparse matrix product $$\sum_v a_{kv} b_{iv}.$$

The second and third right-hand side sums are independent of the item data, and may be computed only once for each cluster, where the third term is in fact constant across all clusters. The fourth right-hand side sum depends on the item data and $p_b$. However, $p_b$ depends only on the background probability, and not cluster data. There is no need to compute this term when deciding how to assign an item, since it is fixed for that item. Accordingly, adopting the definition $$e_k = \sum_{v: p_{kv} > 0} \log\left(\frac{1-p_a}{q-p_b}\right) + \sum_v \log(1-p_b),$$

various example embodiments assign an item to a cluster by computing the partial score:

$$l(x_i \mid z_k) \propto \sum_v a_{kv} b_{iv} + e_k,$$

while the complete score including cluster-independent terms is:

$$l(x_i \mid z_k) = \sum_v a_{kv} b_{iv} + e_k + \sum_v f_v b_{iv},$$

where $f_v = \log(p_b) - \log(1-p_b)$.

On typical data (e.g., cluster size of approximately 20, with an item inventory of several million items), there is only one overlapping term between a random item and a random cluster. With a straightforward sparse matrix multiply implementation, one item-cluster comparison may take about 4 nanoseconds on a 3 GHz single processor machine.

For existing items, which should account for the majority of an item inventory, example embodiments may perform an off-line batch final E-step to build an item-to-product (I2P) map, which is a sparse matrix that may facilitate a lookup of latent products based on items (e.g., query items). Since recommendations are to be derived at the latent product level, it may be useful to store a product-to-item (P2I) map, where $P2I = I2P^T$, to lookup items based on recommended latent products.

Cluster Management

The number of latent products m is an input parameter to the algorithm. The choice of m depends on the main requirements, which may include the desired granularity level of latent products. Penetrating recommendations may be facilitated by fine-grained latent products, but if the granularity is too fine, the recommendations may be noisy and unreliable. This effect may illustrate an instance of precision-recall trade-off. An optimization objective may be to maximize the effectiveness of recommendations.

Example embodiments use machine-learning to learn a relatively large number of latent products with high intra-product uniformity to make precise recommendations, while keeping the size of each product cluster above a certain threshold to maintain an acceptable recall level. Hence, the following heuristics for cluster management may apply:

1. Given n input item examples, initialize $m = \lfloor n/d \rfloor$ centroids as generating latent products by random sampling (e.g., as described above with respect to Parameter Estimation). Here, d is the target average size of a cluster (e.g., d=20).
2. After each EM iteration (e.g., the M-step), eliminate the centroids with a cluster size less than a threshold (e.g., as being too noisy), $|z_k| < \epsilon$. Here, $\epsilon$ is the minimum cluster size to be maintained (e.g., $\epsilon = 5$).
3. After every even EM iteration, break clusters with a size above a threshold (e.g., as being too diverse), $$|z_k| \leq \exp(\mu(\log(|z|)) + \delta\sigma(\log(|z|))),$$

where $\mu(\cdot)$ and $\sigma(\cdot)$ denote the mean and standard deviation of log cluster size, respectively; and $\delta$ gives the $\delta$-sigma threshold (e.g., $\delta=3$). Then, randomly sample a subset of items in the dissolved clusters as new cluster centroids, using the same d as the item-product ratio.

Related Models

Mixture models have been widely used for clustering, where each cluster is represented as a parametric distribution (e.g., a mixture of multinomials for document clustering). Under a mixture model for learning latent products, the likelihood of an item $x_i$ is:

$$p(x_i) = \sum_k p(z_k) p(x_i \mid z_k),$$

where an item $x_i$ is modeled as a convex combination of m latent product distributions $p(x_i|z_k)$ with mixture proportions $p(z_k)$. The mixture model assumes soft product membership of items (e.g., an item-level mixture), and model parameters can be estimated by using the standard EM algorithm. The mixture approach may be more statistically sound for semantically rich data, such as documents and images, but may be less so for item datasets used in item recommendations. Ordinary documents often exhibit multiple topics, but in many cases an item is physically associated with exactly one product. In other words, soft membership may not be well-motivated for item-to-product projection. Instead it may be useful to impose very sparse per-item latent product mixture proportions.

Naïve Bayes Recommender

Having mapped volatile items to persistent latent products, an example embodiment performs item recommendation by using the following naïve Bayes classifier:

$$y^* = \underset{y}{\mathrm{argmax}}\, p(y \mid x)$$
$$\propto \underset{y}{\mathrm{argmax}}\, p(x, y)$$

where x denotes a contextual or historical transaction of the latent product which will be used as the input to the recommender (e.g., a buyer's last purchase), and y indexes the recommended product for next purchase.

Product-Level Recommendation Model

An objective of a recommender may be to maximize sales. Accordingly, it may be useful to compute p(x, y) as the joint probability of purchasing both x and y. However, purchase data may be extremely sparse (e.g., one item purchased by a user in a two-month period), which makes the estimate noisy. Thus, the pure purchase probability may be smooth with other less sparse behaviors yet indicative of user preference, such as clicks (e.g., clicking on a search result and landing on a "view item" page) and bids. Moreover, it is unrealistic to assume a user is exposed to the entire inventory of items, so a normalized preference score should be made conditional on views (e.g., viewing search results). Furthermore, even with clicks and bid co-occurrences, data may still be sparse. Example embodiments may further smooth the co-preference probability with a unigram popularity score, dependent only on the candidate product y, using Laplace smoothing.

Formally, let C be an m×m matrix of co-occurrences, where a subscript pair indexes the co-occurring latent products, and a superscript pair encodes the behavioral types, respectively. For example, $C_{yx}^{vb}$ is the number of users who bid on x and viewed y. An example embodiment considers four types of co-occurrence patterns: (1) bid-bid (bb), (2) purchase-purchase (pp), (3) click-bid (cb), and (4) view-bid (vb). The product-to-product preference probability is:

$$p(y \mid x) = \frac{\alpha_1 C_{yx}^{bb} + \alpha_2 C_{yx}^{pp} + \alpha_3 C_{yx}^{cb} + \zeta}{C_{yx}^{vb} + \zeta / p(y)},$$

where $(\alpha_1, \alpha_2, \alpha_3)$ are coefficients for a convex combination of the three co-preference patterns, $\zeta$ is the smoothing factor, and $p(y)$ is the baseline popularity of y:

$$p(y) = \frac{\beta_1 C_y^p + \beta_2 C_y^b + \beta_3 C_y^c}{\max(C_y^v, \varepsilon)},$$

where $(\beta_1, \beta_2, \beta P_3)$ are mixture weights and $\epsilon$ is a small value for numerical protection (e.g., $\epsilon=1.0\times10^{-10}$). Here, C with a single subscript denotes a unigram count (e.g., for one latent product only) of a behavioral type encoded in a superscript. For example, $C_y^v$ is the number of users who viewed y.

Counting Co-Occurrences

Computation of the product-to-product co-preference probability p(y|x) mainly involves counting co-occurring events, which may be a computational bottleneck in offline training. Of the four co-occurrence matrices in the above equation for p(y|x), the view-bid matrix $C^{vb}$ may be the least sparse. $C^{vb}$ may be used as an example to discuss several potential design issues for efficient implementations.

Example embodiments may leverage efficient sparse matrix operations to obtain the co-occurrence matrices. Since events may be counted in terms of users, it is possible to form product-user account matrices, one for each relevant event type, by scanning the transactional data once and performing the inference described above with respect to k*. Let $D_v$ be an m×l product-user matrix of view counts, $D_b$ be a bid counts matrix with the same dimensions, and both use sparse representation. The co-occurrence matrix $C^{vb}$ is then obtained by a sparse matrix multiplication $D_v D_b^T$. Furthermore, in various example embodiments, only $C^{vb}$ entries are counted when at least one of the three numerator terms has a non-zero corresponding entry. A dominant user behavioral conversion flow is: view→click→bid→purchase, and view events are typically an order of magnitude denser than non-view events. Accordingly, to leverage the data sparsity further, an example embodiment may only count $C^{vb}$ entries when the corresponding $C^{cb}$ count is non-zero:

$$C^{vb}=D_v D_b^T, \forall(x,y) \text{ where } C_{yx}^{cb}>0.$$

The time period over which the co-occurrence matrices are defined (e.g., counted) may be important, since the association between co-occurring events may become noisier as they are spaced further apart. Thus, example embodiments only count co-occurring events if they happened within a relatively short overlapping time window. On the other hand, if the length of an overlapping window is too short, there may be very few co-occurrences collected. Example embodiments use a t×w sliding window to count co-occurrences, which works as follows. Along the time axis, w-day transactional data is incremented into a t×w-day sliding window, over which is performed an iteration of counting. The t×w-day sliding window thus moves forward by w-days per iteration until the entire training period is exhausted. This design asserts that a pair of events that co-occurred within a small w-day window casts t times as many counts as a pair of event that happened t×w-days apart. Experiments show that a 3×7-day sliding window may give optimal recommendations, as illustrated in FIG. 1, in which four iterations 102, 104, 106, and 108 of counting are shown.

A typical user first issues a search query, then views the search results, and potentially clicks to some result to view an item page (e.g., to "land on" an item page). Since the voluntary user conversion course can be considered as a Markov chain and starts with a click-through (e.g., view→click), it may be helpful to model the click-through process in a principled matter. The presentational position or rank of a result link in a search result page may have significant impact on the click-through rate (CTR) for that result link. Example embodiments adopt a position-bias model, which imposes a positional prior to normalize (e.g. multiply) view count. A bottom position may have a lower prior probability than those higher up in a search result page, where a positional prior can be interpreted as the probability of a user actually (e.g., physically) viewing the link. Thus, a result link showing at a lower position may only have a fraction of one normalized view count. From a click-through perspective, a user clicking lower-position item links effectively casts more preference votes (e.g., in evaluating p(y|x)) than if those links were shown at higher positions. Example embodiments may use an empirical positional prior distribution as follows:

$$p(r; \eta, \phi) = \frac{1}{Z} r^{-\eta}, r = 1, 2, \ldots, \phi.$$

Here, $\eta$ is a positive real number implying the rate at which a prior decreases as the positional rank r moves down in a search result page, $\phi$ is the lowest rank the prior covers, and $$Z = \sum_{r=1}^{\phi} r^{-\eta}$$

is a normalizing constant. A default eBay search result page shows 50 item links, and almost all clicks are from the first page. Hence, it may be practically sufficient and computationally efficient to define the prior over a discrete and finite range [1, 50]. When $\eta=0.5$, there may be a 7-fold a priori difference in CTR between the top and bottom positions, which fits well to the eBay search click-through data and is aligned with other similar domains, such as sponsored search.

Counting events in a number of unique users provides one level of a robot filtering (e.g., machine filtering) mechanism, since each user votes only once with respect to one co-occurrence. In addition, example embodiments may apply another level of data-driven robot filtering by removing users whose total number of activities during a w-day window is above a certain threshold (e.g., $thres_{7\text{-}day}=2000$).

Item-Level Ranking Model

In online recommendation of items, a triggering event may be an item transaction (e.g., previous purchase). An example system may then retrieve a candidate set of items and rank them to recommend the top N items. More formally, let i be a seed item and j be a candidate item. A probabilistic scoring function to perform recommendation may be expressed as:

$$j^* = \operatorname*{argmax}_{j} p(j \mid i).$$

Recall that both the latent product clustering and product-level recommendation models are derived in a statistically rigorous way, and hence provide probabilistic measures. The item-to-item recommendation score can be factorized as the following Markov chain:

$$p(j|i)=p(j|y)p(y|x)p(x|i),$$

where x and y denote input and recommended latent products, respectively. Given the hard membership assumption, marginalization over latent variables x, y is unnecessary, and the first link p(x|i) is deterministic. Additionally, the auction end time may be incorporated as a factor in the scoring function. In example embodiments, user actions burst during the end time (e.g., within hours of closing) of an auction. Experience from search suggests that auction end time may be a dominant factor in ranking items. Example embodiments thus impose a time prior distribution bias towards ending-soon auction items. The final item-level scoring function may be expressed as:

$$p(j,\Delta h(j)|i)=p(j|y)p(y|x)p(\Delta h(j)),$$

where x=arg $\max_{x'}$, l(i|x'), and $\Delta h(j)$ is the time difference in hours from recommendation serving time to auction end time of item j. The product-to-product score p(y|x) has been previously derived as the product-to-product preference probability, as described above with respect to the Product-level Recommendation Model. The item-product membership score p(j|y) and the time-dependent factor p($\Delta h(j)$) provide additional contributions in example embodiments.

The inference step in k* (as described above with respect to Efficient Inference) gives the MLE of latent product assignment but in various example embodiments, the likelihood is not directly usable as a membership score in evaluating p(j,$\Delta h(j)$|i), because item likelihood may not be well calibrated across latent products. Accordingly, example embodiments retrieve multiple y's for a given x to surface a best candidate set of j's. For example, one latent product $y_1$ may be more catalog-like, and its items may be described in very few terms (e.g., some technological items). Another latent product $y_2$ may be less structured, and its items may need more terms to be embodied (e.g., some clothing items). The item likelihoods in $y_1$ may be naturally higher than the ones in $y_2$; but this does not necessarily mean $y_1$ items are more coherent, or that they should be ranked higher. Within-product (e.g., intra-product) item log likelihood empirically follows a Gaussian distribution, from which it is possible to obtain a standard Gaussian distribution with zero mean and unit variance. The calibrated item-product membership score may be expressed as:

$$p(j \mid y) = \exp\left(\frac{1}{\sigma}\min(0, (l(j \mid y) - \bar{l}(\cdot \mid y)))\right),$$

where $\bar{l}(\cdot|y)$ is the mean item log likelihood for a latent product, and σ is the standard deviation. Since σ serves as a normalization factor, example embodiments utilized a constant informed by data (e.g., σ=20) for all y's. For example, in one major category, "Clothing, Shoes & Accessories," the item log likelihood variable may have mean −40.5, standard deviation 20.6, median −38.5, and mode −26.0. Notice that the deviation $l(j|y)-\bar{l}(\cdot|y)$ is upper-bound by zero to preserve the probabilistic interpretation of the membership score p(j|y). This may be suitable for ranking items, since the distribution of item log likelihood is typically left-skewed (e.g., with more close-to-centroid items and fewer loosely-clustered items), and it may be useful to distinguish boundary cases from reliable assignments.

The auction-and-time factor p($\Delta h(j)$) may be interpreted as a priori purchase probability with respect to remaining auction time and made independent of any specific item content. Example embodiments assume the time prior follows an exponential distribution over discrete hourly time windows traversing backwards from auction end time to the current time; and hence introduce a smoothed exponential decay function as a time-dependent score:

$$p(\Delta h(j))=\max(\pi,\exp(-\lambda\Delta h(j))).$$

Here, $\Delta h(j)=\lfloor (t_{end}-t_{now})/3600 \rfloor$, and λ is a positive decay constant. A two-day half-life gives λ=log(2)/47. The smoothing factor π provides a minimum score (e.g., π=0.5 enforces that any items beyond the half-life still get a 0.5 time-dependent score). This time score lower-bounding may provide a useful mechanism to mix up time-sensitive items (e.g., auction items) and time-insensitive items (e.g., fixed-price items).

One potential effect of the item ranking model derived above stems from viewing the user conversion sequence as a stochastic process, and hence example embodiments of the model include estimating the purchase probability, as in p(j,$\Delta h(j)$|i). Ranking recommendations directly in purchase probability may optimize the number of purchases, but this statistical framework may be easily extended to maximize other business metrics as well, such as revenue or user satisfaction. User purchase may be expressed as a Bernoulli process with a success probability estimated by p(j,$\Delta h(j)$|i). Example embodiments may then multiply some utility function f(u) by the purchase probability to obtain an estimate of the expected utility:

$$E(f(u))=f(u)p(j,\Delta h(j)|i),$$

where u is the unit price of a target item, which is given for fixed-price items. For active auction items, the price may be estimated as a smoothed average price of closed items belonging to the same latent product:

$$\hat{u}(\cdot \mid y) = \frac{\sum_{j \in y} u(j) + p}{\sum_{j \in y} 1 + \rho/u_0},$$

where u(j) is the winning bid amount of item j belonging to product y, and ρ is a smoothing constant giving a default price $u_0$.

To optimize revenue, example embodiments may treat the utility function as the pricing model or listing fee structure:

$$f_{rev}(u) = a_1 \min(u, b_1) + a_2 \max(0, (\min(u, b_2) - b_1)) + a_3 \max(0, (u - b_2)),$$

where $(a_1, a_2, a_3)$ are the listing fees for three consecutive price intervals: $[0, b_1]$, $(b_1, b_2]$, and $(b_2, +\infty]$, respectively. The current values at eBay may be: $(b_1, b_2) = (\$25, \$1000)$ and $(a_1, a_2, a_3) = (0.0875, 0.035, 0.015)$. User perceived utility or satisfaction is more subjective, and example embodiments use log-price as a surrogate for simplicity:

$$f_{usr}(u) = 1 + \log(\max(1, u)).$$

Furthermore, example embodiments apply several post-ranking filtering rules in compliance with domain-specific requirements: (1) items are active as of the time of delivery; (2) items with identical titles are de-duplicated; (3) current prices are below a threshold (e.g., $5000 for clothing category) to avoid recommending excessively expensive items; and (4) items are from sellers with a trust score above a threshold (e.g., 99.99% positive feedbacks).

Experiments

Both the latent product clustering and item ranking models may be evaluated by the quality of recommendations. Online alpha/beta (A/B) testing may evaluate how the new models perform against the current production system in a live environment, but requires a full-fledged production deployment and a fraction of revenue-sensitive live traffic. Offline evaluation thus may be helpful for a closed-loop exploration before going live. Discussed herein are both offline and online evaluations, where offline evaluation may be directed to a sensible objective function and online testing may report metrics of business significance, including, but not limited to, CTR, bid-through rate (BTR), purchase-through rate (PTR), and gross merchandising value (GMV).

Offline Evaluation

A common way to evaluate recommendation models is yet to be established. It may not be fully satisfactory to use general estimations, such as test data log likelihood and perplexity, since these metrics may fail to emphasize the very important yet small head portion of view recall. Other metrics used in rating-based recommendation, such as RMSE (root mean squared error), may not be suitable for click-through data. Example embodiments may adapt an evaluation method established in other similar domains, such as ad targeting, for the recommendation problem.

The quality of prediction is measured by two metrics: (1) the area under the click-view ROC curve (area under curve, or AUC), and (2) the relative CTR lift over a baseline predictor at a certain recall level of view. A click-view ROC curve plots the click recall vs. view recall, from the testing examples ranked in descending order of predicted score. The higher the AUC, the more accurate the predictor; and a random predictor would give an AUC of 0.5 (e.g., a diagonal ROC). Since view recall equals to click recall by random guess, each point on the ROC curve readily gives the relative CTR lift (e.g., click recall/view recall) over a baseline random predictor. The lift interpretation, besides having ease of implementation, motivates the use of a click-view ROC for click-through data, instead of a traditional ROC. A traditional ROC plots true positive (TP) rate vs. false positive (FP) rate. For the click-view ROC, example embodiments use (TP+FP)/all examples as the x-axis. In the context of recommendation, positive feedbacks include not only clips, but also bids, purchases, and even revenue. Therefore, example embodiments use "click" or "CTR" in the above evaluation metrics in a generalized sense, which can also refer to other positive feedbacks.

Recommendation of items may be based on a contextual or historical transaction such that a user who has purchased i would also likely purchase j. Some example embodiments may use the item and transactional data over a training period to learn the latent product and recommendation models, thus deriving a scoring function of co-preference item pairs (j, i), where the temporal order of (j, i) is deliberately ignored for better coverage. For the transactional data over a testing period, other example embodiments form a global event string of sequential-preference item pairs, where the temporal order is respected for faithful evaluation. The scoring function may then be applied to score and rank test item pairs. Example embodiments compare the ranked list against the ground-truth feedbacks to compute ROC curve and lift. The evaluation method using log-price scoring for purchase feedback is formalized in Algorithm 1 below.

---

Algorithm 1: Offline evaluation

---

Data structure: Event
begin
   /* For non-view event types: 0:view, 1:click, 2:bid, 3: bin, 4:watch, 8: winning bid.   */
   /* For view count: normalized by positional prior.   */
1   int u ;    /* user id */
2   date t ;    /* events time */
3   int c ;    /* non-view event type */
4   float v ;    /* position-normalized view count */
5   float a ;    /* bid amount */
6   int j ;    /* event item id */
7   int i ;    /* last winning item id, o/w 0 */
end
Input: test event stream Event[e]
Output: ROC curve
8  begin
9    Event[e] ← sort test event stream by (u, t);
10   i[e] ← find most recent winning item by that user;
    /* To avoid stable sort artifacts   */

```
Algorithm 1: Offline evaluation

11    Event[e] ← RandomPermute(Event[e]);
      /* Score candidate item set                                          */
12    foreach j where i is nonzero do
13        p(j,Δh(j)|i) ← p(j|y)p(y|z)p(Δh(j));
14        E(f(a)) ← f_usr(a)p(j,Δh(j)|i);
15        c ← c ≥ 8?1 : 0 ;
16        v ← v where i is nonzero;
17    end
      /* ROC curve                                                         */
18    curve ← ROC(E(f(a)),c,v);
19 end
```

Experiments were conducted for one major category, "Clothing, Shoes & Accessories," which may be representative of the unstructuredness, volatility, sparsity, and large scale characteristics of the domain. One month of item and transactional data was used for training, and a following week was used for testing. For the recommendation modeling, the training data contained approximately 60 M items, 500 M search events, and 200 M down-streaming transactions. The experiments involved sampling 50% search log for counting view-related co-occurrences. For iterative clustering, the item data was down-sampled to 4 M items, biased toward active items (e.g., items with at least one bid). After 10 EM iterations, 119,389 clusters converged with an average item log likelihood of −16.75. With the learned latent products, an inference step was performed to assign all items, including those only seen in testing data, to their MLE latent products, which yielded an average item log likelihood of −30.50. The experiments were run on a single node with 2×Quad-Core 3.2 GHz 64-bit processors and 8 GB random-access memory (RAM), using a multi-core parallel implementation. It took about 18 hours to learn clusters and 26 hours to assign 60 M items. Accordingly, one item assignment occurs in less than 2 milliseconds, which may be sufficient for online real-time performance. The recommendation learning (offline for $p(y|x)$) occurred in 6 hours. Example embodiments achieved above 200 Mflops throughout, and hence may be considered as highly efficient and scalable.

Experiments on some example embodiments used 10 variations in 2 scoring functions by 5 positive feedback types, as summarized in Table 1 below. For each type of positive feedback, the log-price scoring was benchmarked with the popularity baseline, with the only difference being that the $p(y|x)$ term in the equation for $E(f(u))$ is replaced with $p(y)$ for the popularity score. This may show the value added by the seed item. Varying the feedback types may demonstrate how the proposed recommendation models optimize different key metrics.

Figure 2:
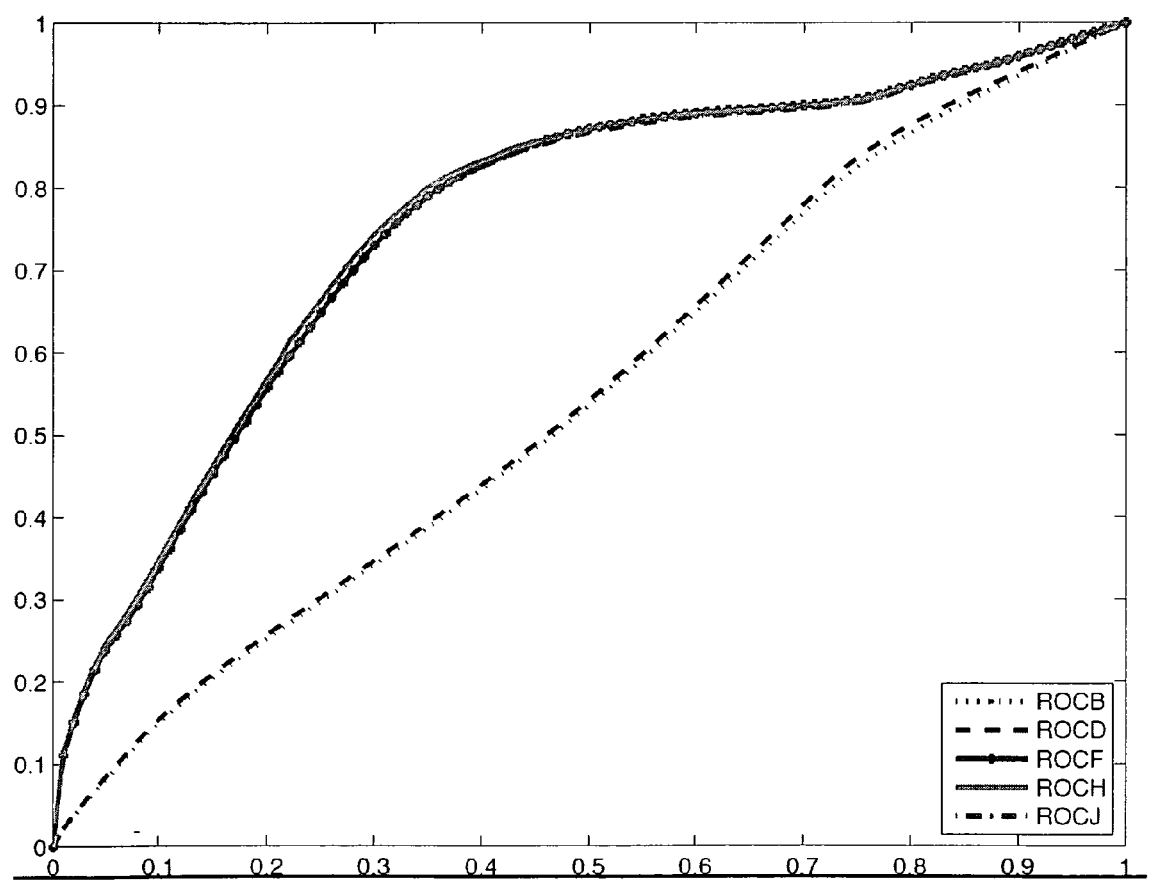
FIG. 2 is a graph showing experimentally derived receiver operating characteristic (ROC) curves for log-price scoring, according to some example embodiments.
Figure 3:
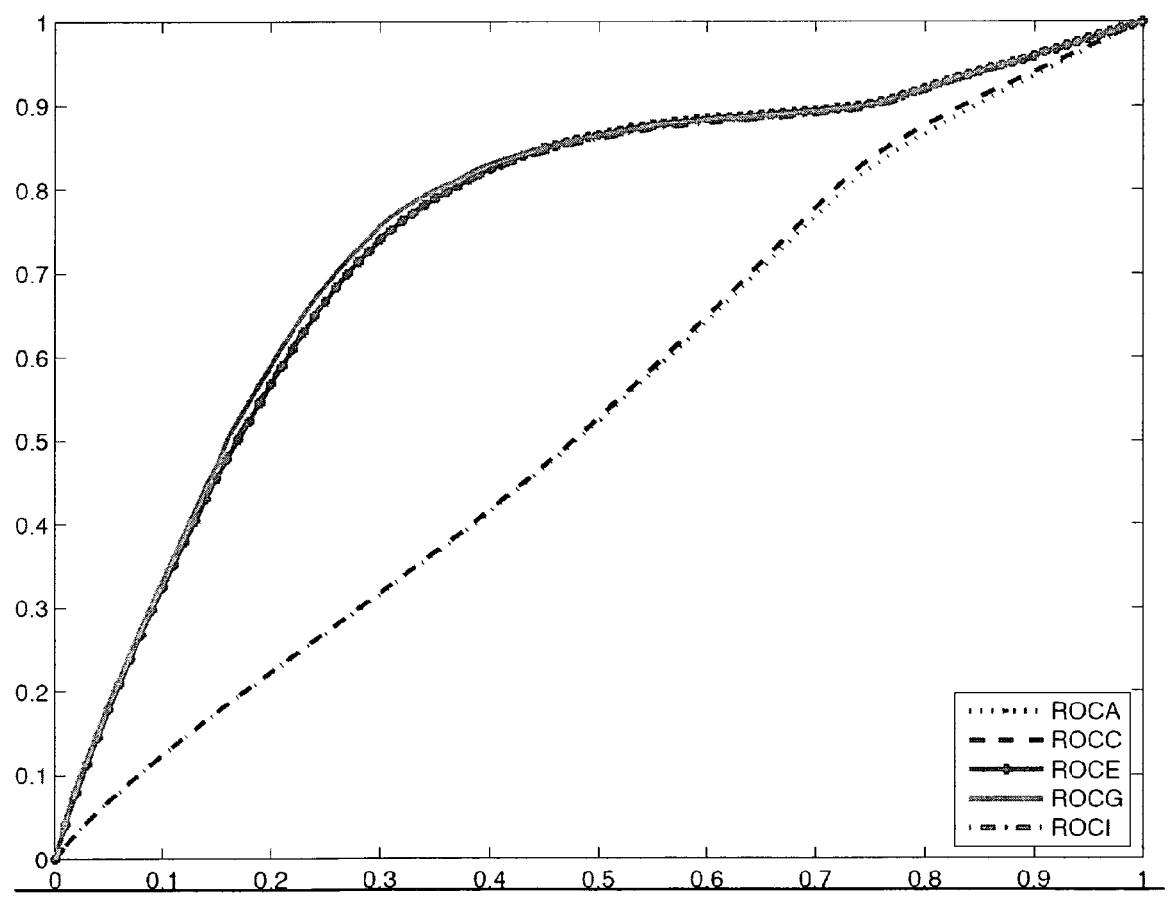
FIG. 3 is a graph showing experimentally derived ROC curves for baseline popularity, according to some example embodiments.
Figure 4:
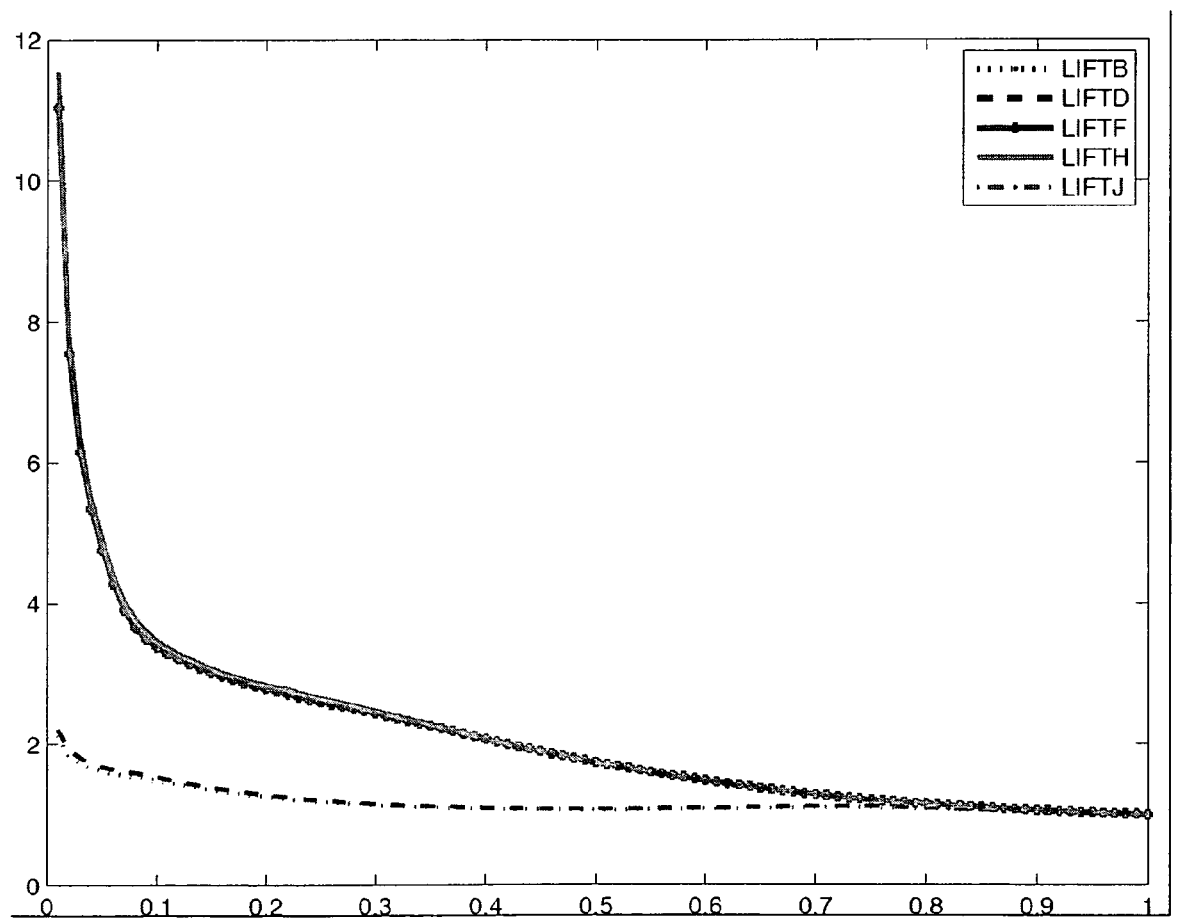
FIG. 4 is a graph showing experimentally derived lift curves for log-price scoring, according to some example embodiments.
Figure 5:
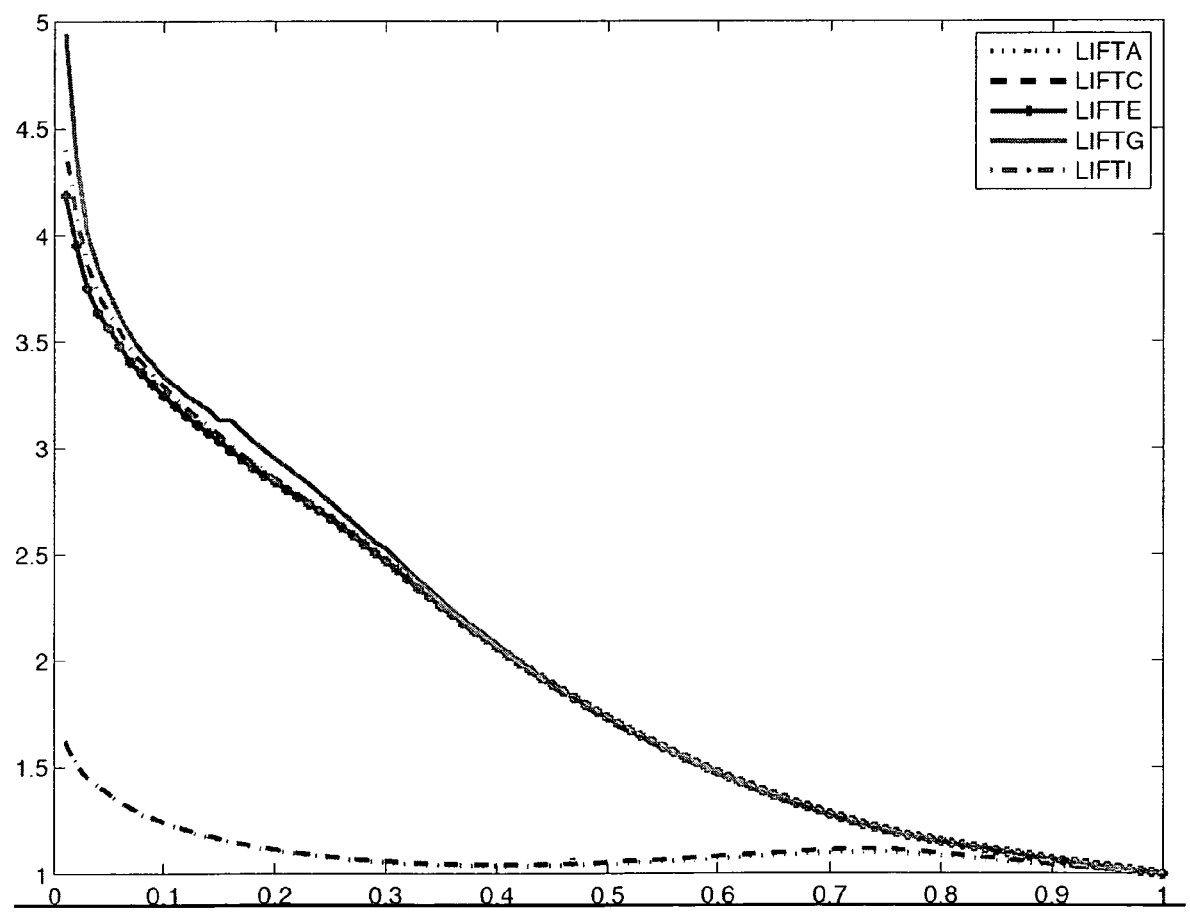
FIG. 5 is a graph showing experimentally derived lift curves for baseline popularity, according to some example embodiments.

FIGS. 2 and 3 respectively plot the ROC curves for the proposed log-price scoring and for the baseline popularity. FIGS. 4 and 5 respectively plot the lift curves for log-price scoring and for baseline popularity. The numerical results of areas under the ROC curves and lifts are summarized in Table 2 below.

TABLE 1

Experimental Design

| Label | Scoring function | Positive feedback |
|---|---|---|
| A | popularity | click (c = 1) |
| B | log-price (E(f(u))) | click (c = 1) |
| C | popularity | bid, watch, purchase (c ≥ 1) |

TABLE 1-continued

Experimental Design

| Label | Scoring function | Positive feedback |
|---|---|---|
| D | log-price (E(f(u))) | bid, watch, purchase (c ≥ 1) |
| E | popularity | purchase (c ≥ 8) |
| F | log-price (E(f(u))) | purchase (c ≥ 8) |
| G | popularity | revenue ((c ≥ 8) * $f_{rev}(a)$) |
| H | log-price (E(f(u))) | revenue ((c ≥ 8) * $f_{rev}(a)$) |
| I | popularity | log-price ((c ≥ 8) * $f_{usr}(a)$) |
| J | log-price (E(f(u))) | log-price ((c ≥ 8) * $f_{usr}(a)$) |

TABLE 2

AUCs and Lifts at Top View Recalls

| Label | AUC | Lift @ 1% | Lift @ 2% | Lift @ 5% | Lift @ 10% |
|---|---|---|---|---|---|
| A | 0.5317 | 1.62 | 1.52 | 1.37 | 1.24 |
| B | 0.5439 | 2.13 | 1.85 | 1.62 | 1.49 |
| C | 0.5358 | 1.62 | 1.52 | 1.38 | 1.24 |
| D | 0.5499 | 2.22 | 1.93 | 1.68 | 1.54 |
| E | 0.7487 | 4.19 | 3.95 | 3.56 | 3.25 |
| F | 0.7543 | 11.03 | 7.55 | 4.75 | 3.38 |
| G | 0.7538 | 4.95 | 4.37 | 3.73 | 3.33 |
| H | 0.7583 | 11.55 | 7.79 | 4.92 | 3.48 |
| I | 0.7473 | 4.40 | 4.10 | 3.63 | 3.29 |
| J | 0.7522 | 10.98 | 7.53 | 4.76 | 3.39 |

As the results show, the log-price co-preference scoring outperforms the popularity baseline for all types of positive feedbacks. For the revenue feedback, the proposed recommendation model yields an AUC of 0.76. The gain in lift is more pronounced. The recommendation model obtains 11.6 times relative revenue lift at the 1% view recall, and 2-3 times better than the popularity baseline at the 1-2% view recall range. The proposed recommender may optimize key metrics very well including, but not limited to, purchase, revenue, and log-price.

Discussion

The above discussion presented a generative clustering model to learn persistent latent products from otherwise unstructured and dynamic items, a probabilistic recommendation model to learn co-preference patterns from historical transactional data, and, hence, a comprehensive and statistically sound solution to recommendation for long-tell marketplaces (e.g., eBay). The proposed methodology is, however, of much generality.

The generative clustering model may be a simple yet principled way to capture hidden structure underlying volatile and heterogeneous data, and thus may enable reasoning on such data for applications such as search and recommendation. This type of data may accumulate on the Web (e.g., the Internet) as social-networking sites (e.g., Facebook), video-sharing sites (e.g., YouTube), and micro-blogging services (e.g., Twitter) gain popularity. An alternative method for this data reduction purpose may be the traditional k-means clustering. Nevertheless, since k-means is equivalent to a discrete variant of EM algorithm for mixtures of Gaussians, it may not work well with text and high-dimensional data. Moreover, the generative clustering may be readily tended to non-multinomial or continuous data, as described above.

In example embodiments, the recommendation model is learned (e.g., machine-learned) by assuming the user conversion flow is a stochastic process and using the position-normalized view count as the denominator. This yields a probabilistic measure of preference, possibly conditioned on some previous transactions. The probabilistic scoring function may be further used for optimizing other recommendation metrics of business interest, and it also may be leveraged by other important applications as a user preference feature, such as search results re-ranking by user click-through feedback or perceived relevance.

Furthermore, item-based recommenders may be evaluated offline using the approach described herein, which may be particularly suitable for click-through data. The evaluation measurements (e.g., AUC and lift) may be superior to other summary estimations, such as test data log likelihood, since the former bears direct business significance. The closed-loop offline evaluation framework may considerably expedite exploration of much larger model and parameter spaces.

Example Systems and Methods

Figure 6:
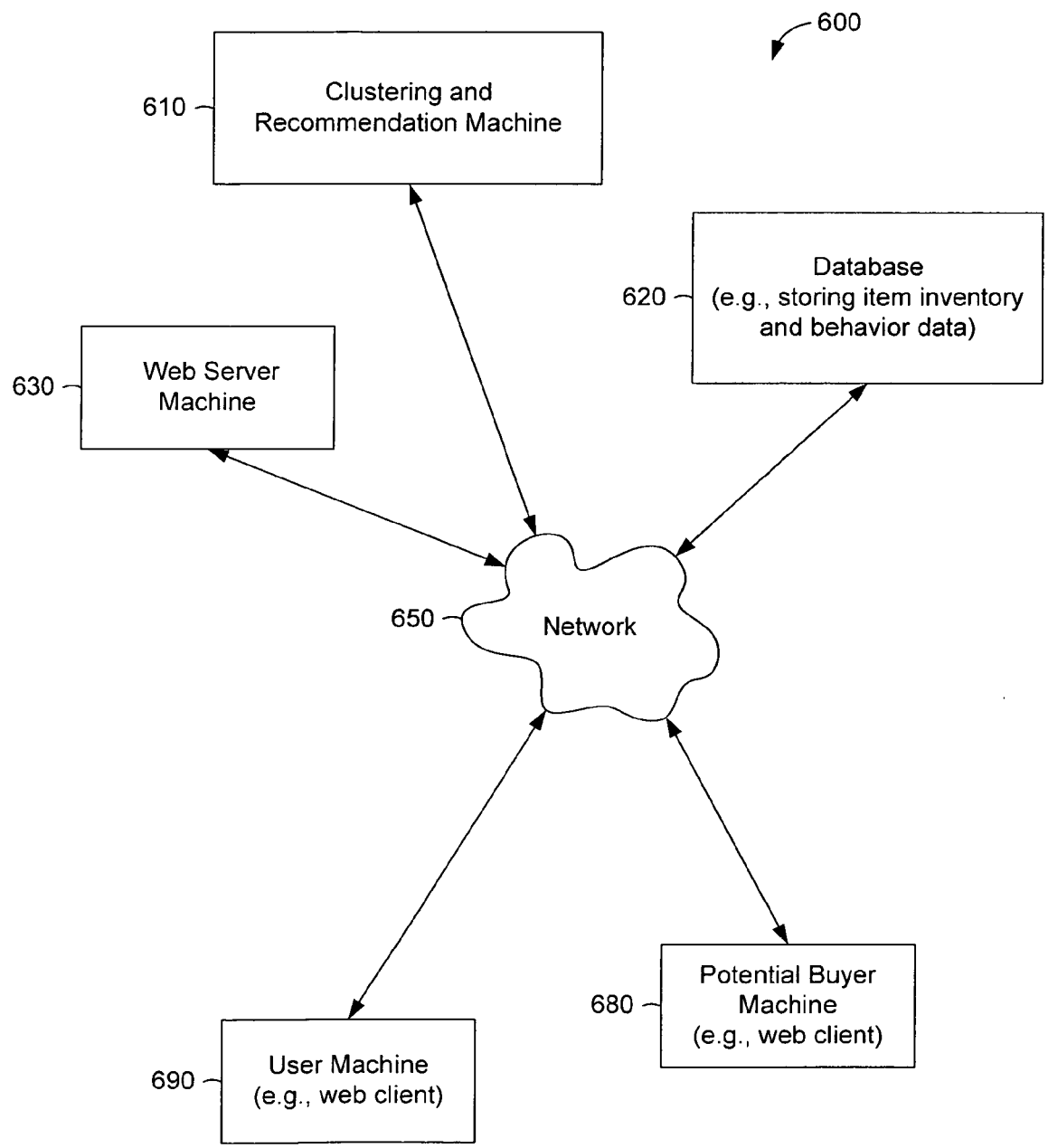
FIG. 6 is a network diagram illustrating a system including a clustering and recommendation machine, according to some example embodiments.

FIG. 6 illustrates a system 600 that includes a clustering and recommendation machine 610, according to example embodiments. The system includes database 620, a web server machine 630, a potential buyer machine 680 (e.g., a machine of a potential buyer), and a user machine 690 (e.g., a machine of a user), all connected together via a network 650. The clustering and recommendation machine 610 is described in greater detail below with respect to FIG. 7.

The database 620 may be implemented as an external storage device of the clustering and recommendation machine 610, or alternatively, in a separate machine to store records of the database 620. The database 620 may store an item inventory, as well as behavior data related to one or more items. For example, the database 620 may store an item inventory (e.g., of a network-based publication system, or of an online marketplace) and historical or transactional data of users (e.g., the user of the user machine 690) with respect to items or products represented in the item inventory.

The web server machine 630 serves web pages to one or more web clients, via the network 650. The web server machine 630 also may provide Internet-based services to the web client.

The user machine 690 is a web client (e.g., a web client machine) of the web server machine 630 and is associated with a user (e.g., of a network-based publication system, or of an online marketplace).

The potential buyer machine 680 is associated with a potential buyer of one or more items from the item inventory. The potential buyer machine 680 may be a web client of the web server machine 630.

Any of the machines shown in FIG. 6 may be implemented in a general-purpose computer modified (e.g., programmed) by software to be a special-purpose computer to perform the functions described herein for that machine. For example, a computer system able to implement any one or more of the methodologies described herein is discussed below with respect to FIG. 13. Moreover, any two or more of the machines illustrated in FIG. 6 may be combined into a single machine, and the functions described herein for a single machine may be subdivided among multiple machines.

The network 650 may be any network that enables communication between machines (e.g., the web server machine 630 and the potential buyer machine 680). Accordingly, the network 650 may be a wired network, a wireless network, or any suitable combination thereof. The network 650 may include one or more portions that constitute a private network, a public network (e.g., the Internet), or any suitable combination thereof.

Figure 7:
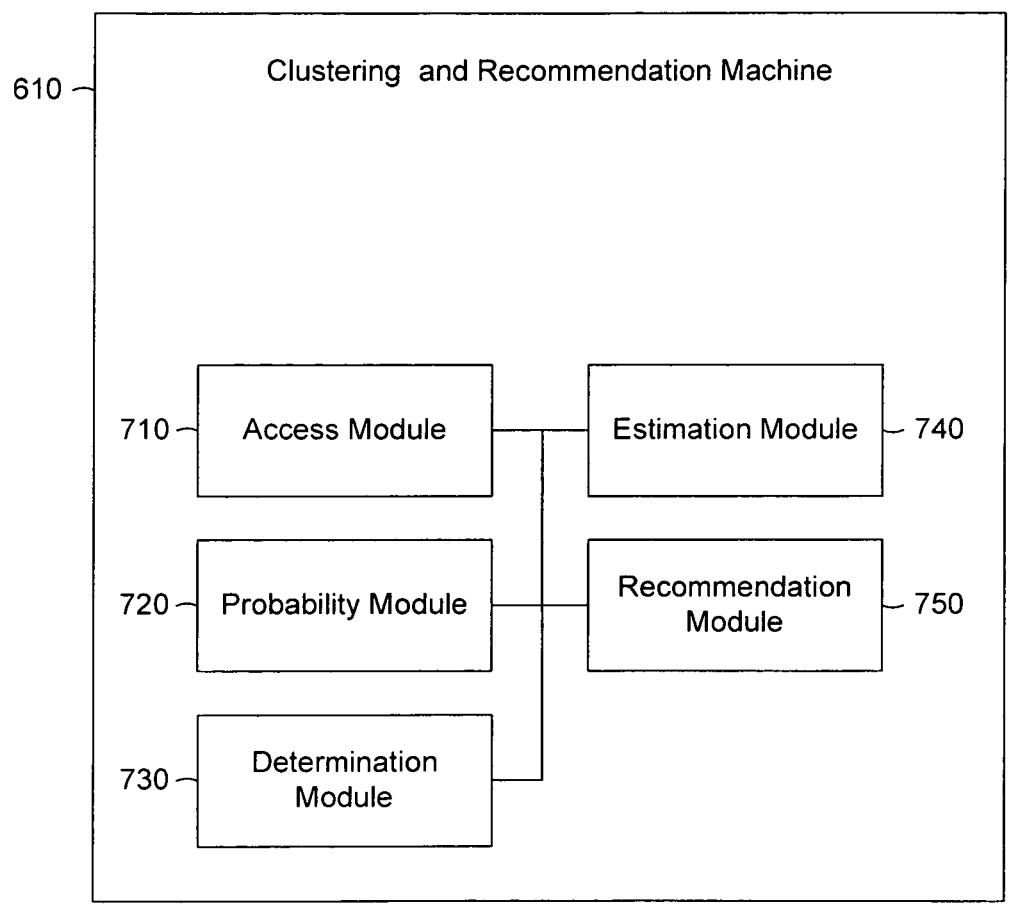
FIG. 7 is a block diagram of a clustering and recommendation machine, according to some example embodiments.

FIG. 7 illustrates the clustering and recommendation machine 610, according to example embodiments. The clustering and recommendation machine 610 includes an access module 710, a probability module 720, a determination module 730, an estimation module 740, and a recommendation module 750. Any of these modules may be implemented in hardware, as described in greater detail below following the discussion of FIG. 13.

The access module 710 accesses item data that describes an item. The item data may be generated by a seller of the item and may be stored in the database 620 (e.g., in the item inventory). The item data may include a title, a description, an attribute name, an attribute value, a name-value attribute pair, a price, a size, or any suitable combination thereof, represented by an item variable.

The item variable may be a binary variable, a categorical variable, or a continuous variable. As a binary variable, the item variable represents an occurrence of a term in textual data that describes the item (e.g., TRUE or 1, representing presence of the phrase "new-in-box" in a free-form description of the item). As a categorical variable, the item variable represents an attribute pertinent to the item (e.g., color number 0, representing "black," out of a list of eight allowable colors). As a continuous variable, the item variable represents a number pertinent to the item (e.g., a price of "34.99").

The access module 710 also accesses a vector that represents a cluster of items. As noted above, the cluster of items represents a latent product. Each item of the cluster is a specimen of the latent product.

The vector includes a probability distribution represented as a set of probability parameters. For example, the probability distribution may be a binomial distribution, a multinomial distribution, a Gaussian distribution, or any suitable combination thereof. Accordingly, the probability parameter may be a Bernoulli success probability, a multinomial parameter, or a Gaussian mean.

The access module 710 additionally accesses behavior data pertinent to the cluster of items. The behavior data facilitates probabilistic recommending of the item and may be stored in the database 620 (e.g., historical or transactional data of user-initiated events with respect to items or products represented in the item inventory).

The behavior data includes an event record that represents a first event type pertinent to the latent product corresponding to the cluster of items. As noted above, an event type may be a purchase, a bid, a click, or a page view. For example, a first event type may be a purchase of a specimen of the product, a bid on a specimen of the product, a click to request information about the product, or a page view event referencing information about the product.

The access module 710 further accesses popularity data, a deadline of the item, and a trust score of the seller of the item. The popularity data is pertinent to the latent product represented by the cluster of items, for example, as described above with respect to Product-level Recommendation Model. The deadline of the item indicates a time after which the item is unavailable for purchase (e.g., an auction end time). The trust score of the seller is an indicator of trustworthiness ascribed to the seller (e.g., a feedback score generated by multiple users who have purchased from the seller).

The probability module 720 calculates a result based on the item variable and based on the probability parameter. The result represents a likelihood that the item is included in the cluster of items (e.g., the item is a specimen of the latent product corresponding to the cluster). In calculating the result, the probability module 720 may calculate a logarithm based on the probability parameter, and calculate a sum based on the logarithm. As discussed above with respect to Efficient Inference, the sum may be calculated by the probability module 720 based on the item variable, or the sum may be calculated independent of the item variable (e.g., the calculation is not based on the item variable).

The estimation module 740 calculates a sum based on the result (e.g., the likelihood that the item is included in the cluster), calculates an argument of the maximum of the sum, and estimates the vector (e.g., estimates one or more new values to modify the vector) that represents a cluster. This enables the clustering and recommendation machine 610 to modify the vector (e.g., iteratively) and hence improve future clustering of items, for example, as described above with respect to Parameter Estimation.

The probability module 720 additionally calculates a probability of co-occurrence, based on the behavior data. The probability of co-occurrence is the probability that a second event type co-occurs with a first event type. The first event type is pertinent to the latent product corresponding to the cluster of items, and the second event type is pertinent to another latent product corresponding to another cluster of items. This probability of co-occurrence may be used to recommend the latter latent product, given an event pertinent to the former latent product. Furthermore, the probability module 720 calculates an argument of a maximum of the probability of co-occurrence for use by the recommendation module 750.

In calculating the probability of co-occurrence, the probability module 720 generates a matrix based on the behavior data. The matrix represents a pattern of co-occurrence pertinent to the first and second event types. For example, the matrix may be an m×m matrix of co-occurrences, as described above with respect to a Product-level Recommendation Model.

In some example embodiments, the behavior data includes position data (e.g., vertical position) of a hyperlink presented in a web page. The hyperlink is operable to request information pertinent to the latent product represented by the cluster of items. The probability module 720 calculates the probability of co-occurrence based on the position data.

The determination module 730 determines that the item is included in the cluster, based on the result, which was calculated by the probability module 720, representing the likelihood that the item is included in the cluster. The determination module 730 stores a map file that includes a correspondence (e.g., a reference, or a pointer) between the item and the cluster, thus associating the item with the cluster (e.g., clustering the item). In some example embodiments, the clustering and recommendation engine 610 receives a query (e.g., from the potential buyer machine 680) pertinent to the item, the product represented by the cluster of items, or both. In response to the query, the determination module 730 performs a lookup operation using the map file. The map file may be a product-to-item map, an item-to-product map, or any suitable combination thereof.

The determination module 730 also determines that instances of two event types occurred within a threshold time period (e.g., within a three-day window), for example, as described above with respect to Counting Co-occurrences. Moreover, the determination module 730 may remove a portion of the behavior data accessed by the access module 710, for example, where the portion is generated by a user (e.g., using the user machine 690) and the removal is based on a number of activities performed by the user within another threshold time period (e.g., a very large number of activities within one hour, likely indicative of machine-generated activity, as opposed to human-generated activity).

Moreover, the determination module 730 determines a rank of an item to be recommended to the potential buyer (e.g., to be presented using the potential buyer machine 680). The determination module 730 may determine the rank based on the deadline of the item received by the access module 710.

Furthermore, the determination module 730 determines a size of the cluster of items. The size of the cluster indicates a number of specimens (e.g., items) of the product represented by the cluster. The determination module 730 compares the size to a threshold and, based on the comparison, may determine that the cluster is to be discarded (e.g., disintegrated entirely, or broken up into smaller clusters) as being too large or too small, for example, as discussed above with respect to Cluster Management.

The recommendation module 750 identifies an item to be recommended to the potential buyer, based on the probability of co-occurrence calculated by the probability module 720. The recommendation module 750 presents a recommendation of the item to the potential buyer. For example, the recommendation module 750 may generate a recommendation indicating that the item is a specimen of the latent product represented by the cluster of items, and the recommendation may include some of the item data accessed by the access module 710.

The recommendation module 750 may identify the item based on the popularity data accessed by the access module 710, and the recommendation module 750 may present the recommendation based on the rank of the item determined by the determination module 730. Moreover, the recommendation module 750 may identify the item based on the argument of the maximum of the probability of co-occurrence, calculated by the probability module 720. Furthermore, the recommendation module 750 may identify the item based on the trust score of the seller, accessed by the access module 710.

Figure 8:
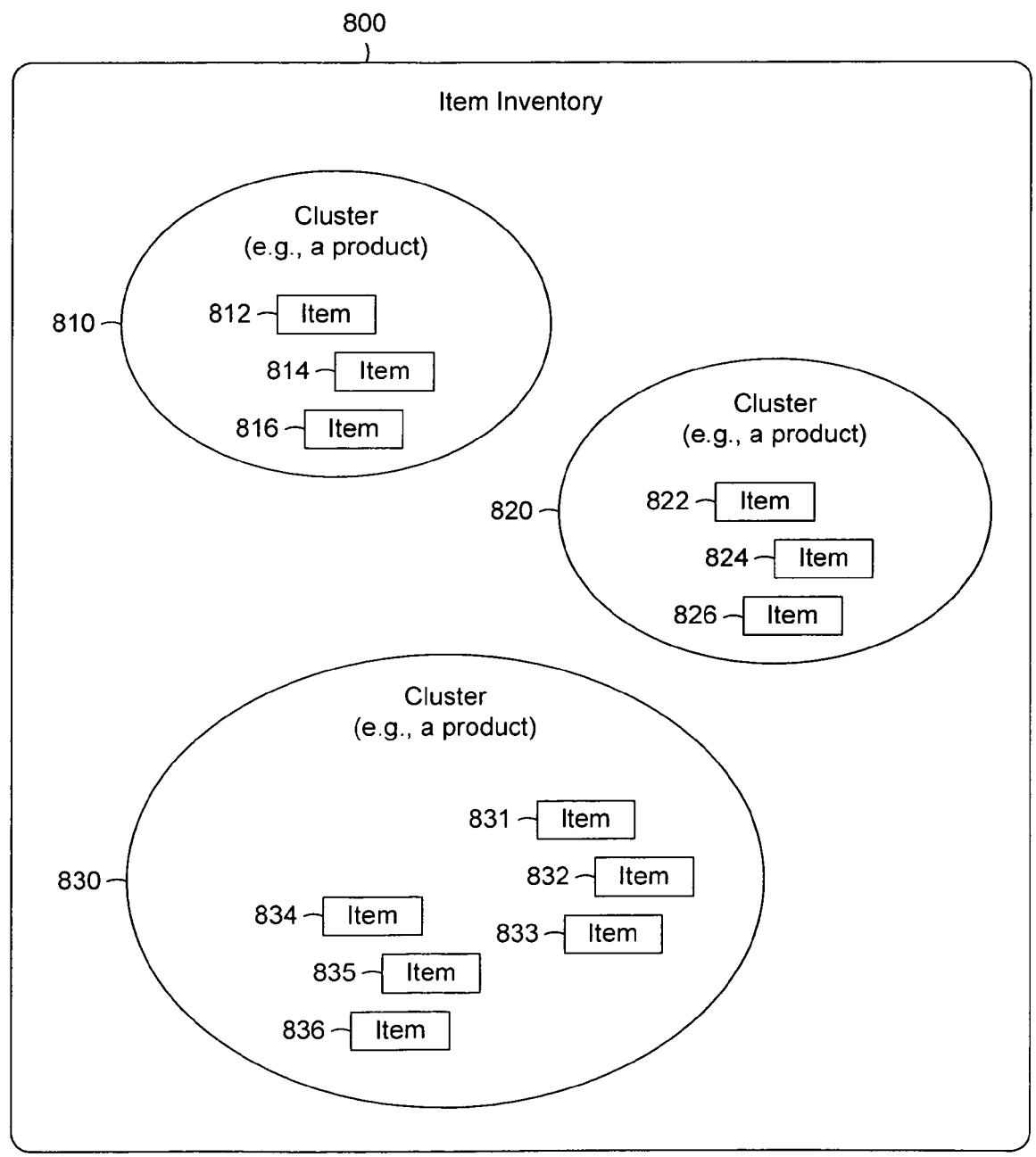
FIG. 8 is a diagram illustrating an item inventory including clusters of items, according to some example embodiments.

FIG. 8 illustrates an item inventory 800, which may be stored in the database 620, according to example embodiments. The item inventory 800 includes multiple clusters 810, 820, and 830. Each cluster is a cluster of items and represents a product (e.g., a latent product), of which each item of that cluster is a specimen. As shown, one cluster 810 includes three items 812, 814, and 816; another cluster 820 includes three items 822, 824, and 826; and a further cluster 830 includes six items 831, 832, 833, 834, 835, and 836. A new item entering the item inventory 800 may be added (e.g., clustered) into a cluster (e.g., cluster 810), using one or more of the clustering methodologies described herein. An item (e.g., item 822) within the item inventory 800 may be recommended, as a specimen of a product (e.g., the product corresponding to cluster 820) to a potential buyer, using one or more of the recommendation methodologies described herein.

Figure 9:
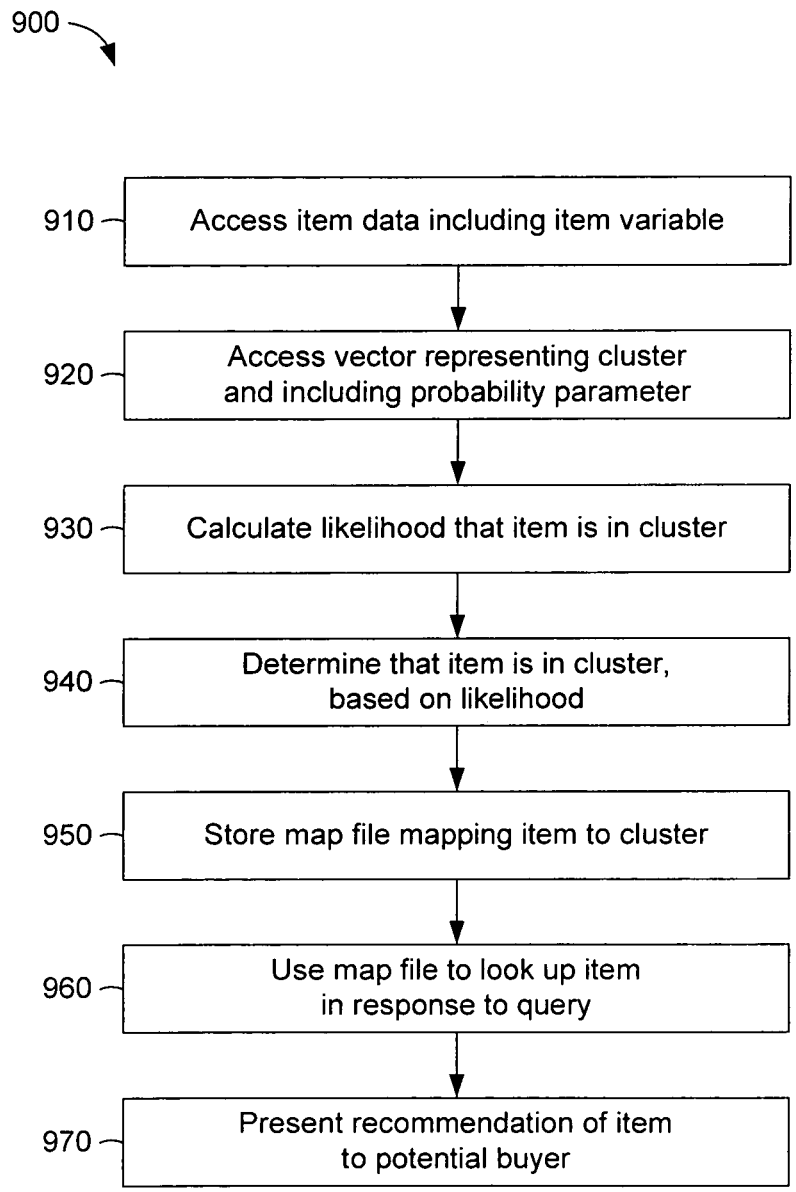
FIG. 9 and FIG. 10 are flowcharts illustrating a method of probabilistic clustering of an item, according to some example embodiments.
Figure 10:
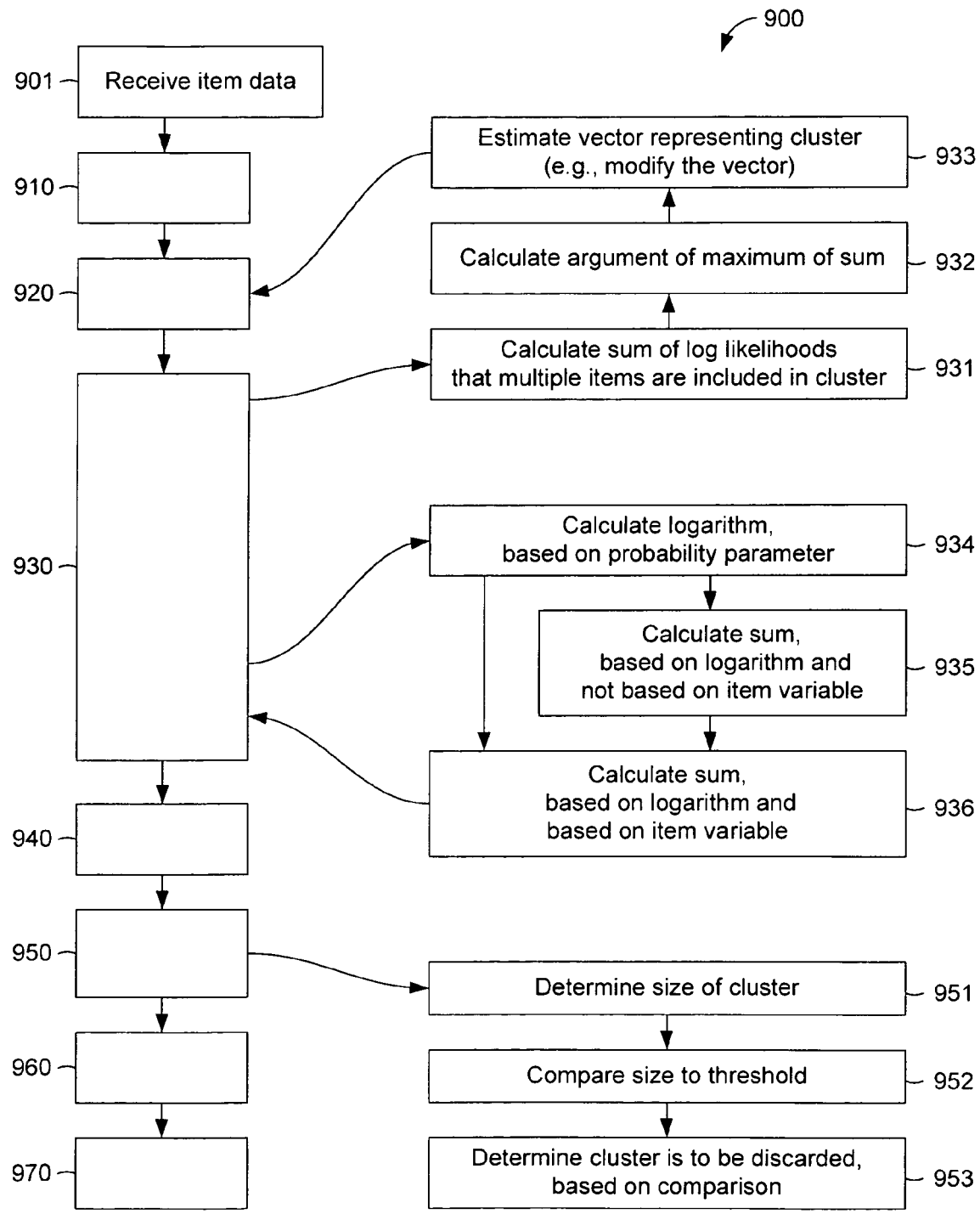

FIG. 9 and FIG. 10 illustrate a method 900 of probabilistic clustering of an item. The method 900 includes operations 901-970 and may be performed using one or more modules of the clustering and recommendation machine 610.

In operation 901, the access module 710 receives the item data, which is descriptive of the item and may be generated by a seller of the item. As noted above, the item data includes an item variable, which is also descriptive of the item. The access module 710 accesses the item data in operation 910.

In operation 920, the access module accesses the vector representing a cluster of items (e.g., cluster 810). As noted above, the vector includes a probability distribution, which in turn includes a probability parameter.

In operation 930, the probability module 720 calculates a result based on the item variable and based on the probability parameter. The result represents the likelihood that the item is included in the cluster (e.g., cluster 810).

In operation 940, the determination module 730 determines that the item is included in the cluster (e.g., cluster 810). This determination is based on the result calculated in operation 930.

In operation 950, the determination module 730 stores a map file that includes a correspondence between the item and the cluster (e.g., cluster 810). As noted above, the map file may be a product-to-item map, an item-to-product map, or any suitable combination thereof. The map file may be stored in the database 620, for example, for use later by any module of the clustering and recommendation machine 610

In operation 960, the determination module 730 performs a lookup operation using the map file stored in operation 950. The lookup operation may be performed in response to a query pertinent to the item, the product represented by the cluster of items, or both.

In operation 970, the recommendation module 750 presents a recommendation of the item to a potential buyer of the item. For example, the recommendation module may initiate a display of information pertinent to the item (e.g., a portion of the item data accessed in operation 910), using the potential buyer machine 680.

In operation 931, the estimation module 740 calculates a sum based on the result, where the sum represents a total logarithmic likelihood that a set of items is included in the cluster (e.g., items 812, 814, and 816). The estimation module 740, in operation 932, calculates an argument of a maximum of the sum, and in operation 933, estimates the vector (e.g., modifies the vector) accessed in operation 920. Operations 931-933 may be used to implement concepts from Parameter Estimation discussed above.

In operation 934, the probability module 720 calculates a logarithm based on the probability parameter included in the vector. The probability module 720, in operation 936, calculates a sum based on the logarithm and based on the item variable included in the item data. In operation 935, according to some example embodiments, the probability module 720 calculates another sum based on the logarithm and not based on the item variable. Operations 934-936 may be used to implement concepts from Efficient Inference discussed above.

In operation 951, the determination module 730 determines a size of the cluster of items, where the size indicates a number of specimens of the product that is represented by the cluster. In operation 952, the determination module 730 performs a comparison of the size to a threshold and, in operation 953, the determination module 730 may determine that the cluster is to be discarded (e.g., disintegrated entirely, or broken up into smaller clusters) as being too large or too small. Operations 951-953 may be used to implement concepts from Cluster Management discussed above.

Figure 11:
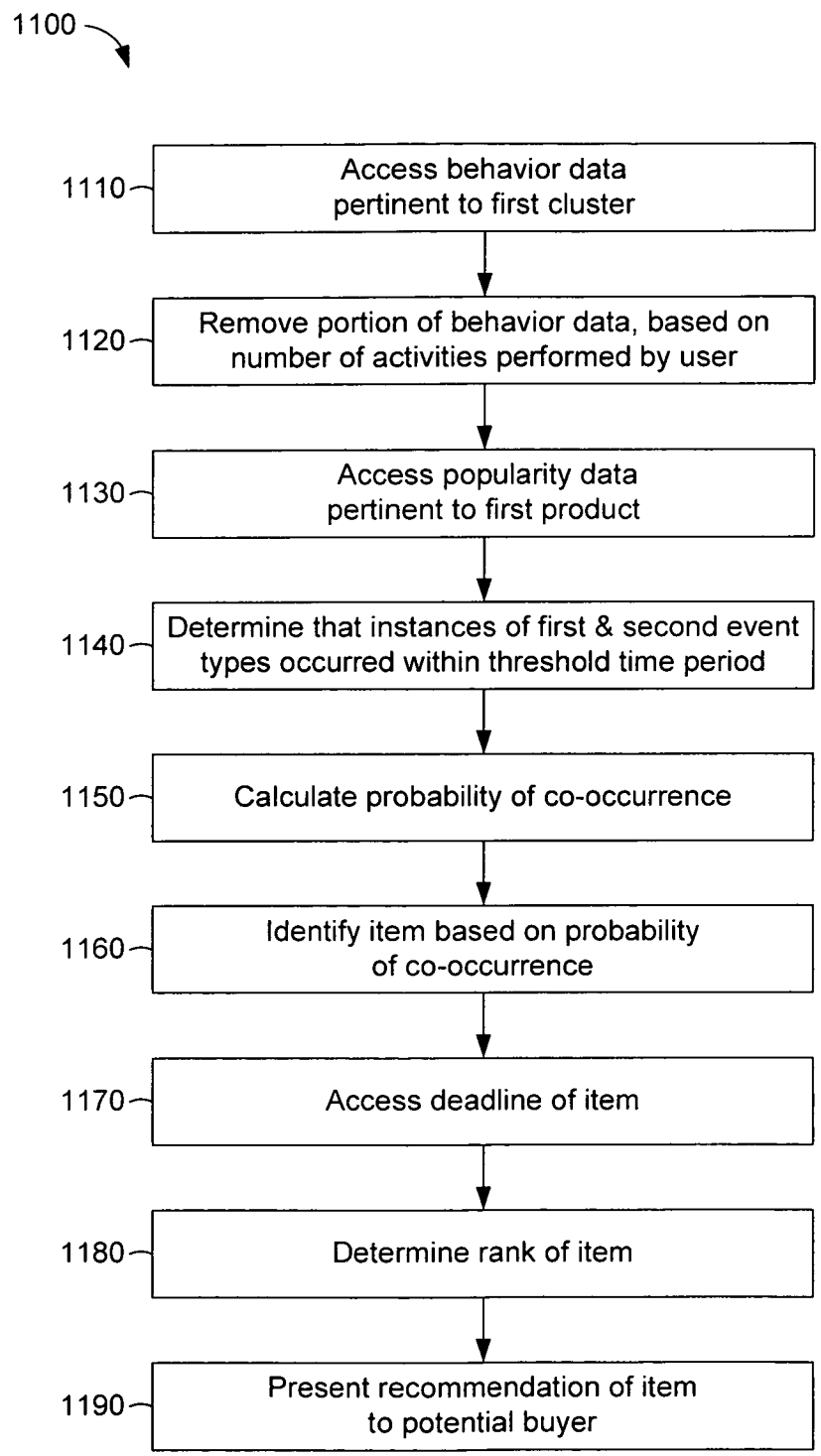
FIG. 11 and FIG. 12 are flowcharts illustrating a method of probabilistic recommendation of an item, according to some example embodiments.
Figure 12:
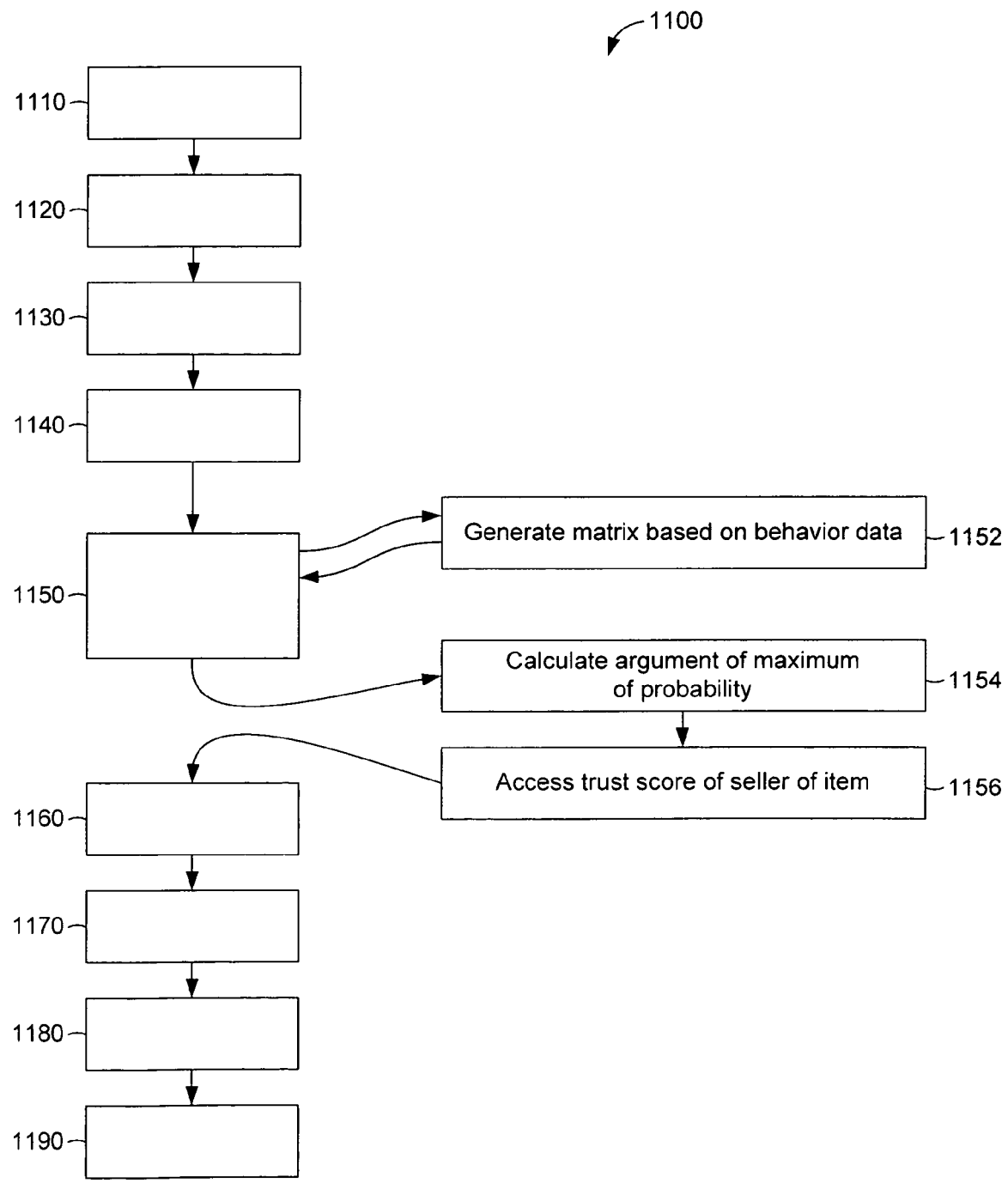

FIG. 11 and FIG. 12 illustrate a method 1100 of probabilistic recommendation of an item, according to example embodiments. The method 1100 includes operations 1110-1190 and may be performed using one or more modules of the clustering and recommendation machine 610.

In operation 1110, the access module 710 accesses the behavior data (e.g., stored in the database 620). The behavior data is pertinent to a first cluster of items (e.g., cluster 820). The first cluster represents a first product of which each item (e.g., item 822) in the first cluster is a specimen, and the behavior data includes an event record that represents a first event type, where the first event type is pertinent to the first product. As noted above, an event type may be a purchase, a bid, a click, or a page view. Accordingly, the first event type may be a purchase of a specimen of the first product, a bid on a specimen of the first product, a click to request information about the first product, or a page view event referencing information about the first product.

In operation 1120, the determination module 730 removes a portion of the behavior data, based on a number of activities performed by the user within a threshold time period (e.g., one hour). Operation 1120 may be used to implement concepts from Counting Co-occurrences discussed above (e.g., robot filtering mechanism).

In operation 1130, the access module 710 accesses the popularity data. The popularity data may be stored in the database 620 and is pertinent to the first product. Operation 1130 may be used to implement concepts from the Product-level Recommendation Model discussed above.

In operation 1140, the determination module 730 determines that an instance of the first event type and an instance of a second event type occurred within a threshold time period (e.g., within a three-day window). The second event type is pertinent to a second product, and the second product is represented by a second cluster of items (e.g., cluster 830). For example, the second event type may be a purchase of a specimen of the second product, a bid on a specimen of the second product, a click to request information about the second product, or a page view event referencing information about the second product. Operation 1140 may be used to implement concepts from Counting Co-occurrences discussed above.

In operation 1150, the probability module 720 calculates a probability of co-occurrence, based on the behavior data. As noted above, the probability of co-occurrences is the probability that the second event type co-occurs with the first event type. Operation 1150 may be used to implement concepts from the Product-level Recommendation Model discussed above.

In some example embodiments, the behavior data includes position data (e.g., vertical position data) of a hyperlink presented in a web page, where the hyperlink is to request information pertinent to the first product. The probability module 720, in performing operation 1150, calculates the probability of co-occurrence based on the position data.

In operation 1152, the probability module 720, in calculating the probability of co-occurrences, generates a matrix based on the behavior data. As noted above, the matrix represents a pattern of co-occurrence pertinent to the first and second event types, and may be an m×m matrix of co-occurrences, as described above with respect to a Product-level Recommendation Model.

In operation 1154, the probability module 720 calculates an argument of a maximum of the probability of co-occurrence. In operation 1156, the access module 710 accesses a trust score of the seller of the item. The trust score may be stored in the database 620.

In operation 1160, the recommendation module 750 identifies an item (e.g., item 831) to be recommended to a potential buyer (e.g., using the potential buyer machine 680). The identifying of the item may be based on the argument of the maximum of the probability of co-occurrence, the trust score of the seller, the popularity data, or any suitable combination thereof.

In operation 1170, the access module 710 accesses a deadline of the item to be recommended, and in operation 1180, the determination module 730 determines a rank of the item, based on the deadline. In example embodiments, the deadline indicates a time after which the item is unavailable for purchase.

In operation 1190, the recommendation module 750 presents a recommendation of the item (e.g., item 831) to the potential buyer (e.g., using the potential buyer machine 680). The recommendation includes some of the item data for the item (e.g., item data accessed in operation 910), and the recommendation indicates the item as a specimen of the second product (e.g., indicates that the item is a member of the cluster corresponding to the second latent product). In performing operation 1190, the recommendation module 750 may present the recommendation based on the rank of the item determined in operation 1180.

Figure 13:
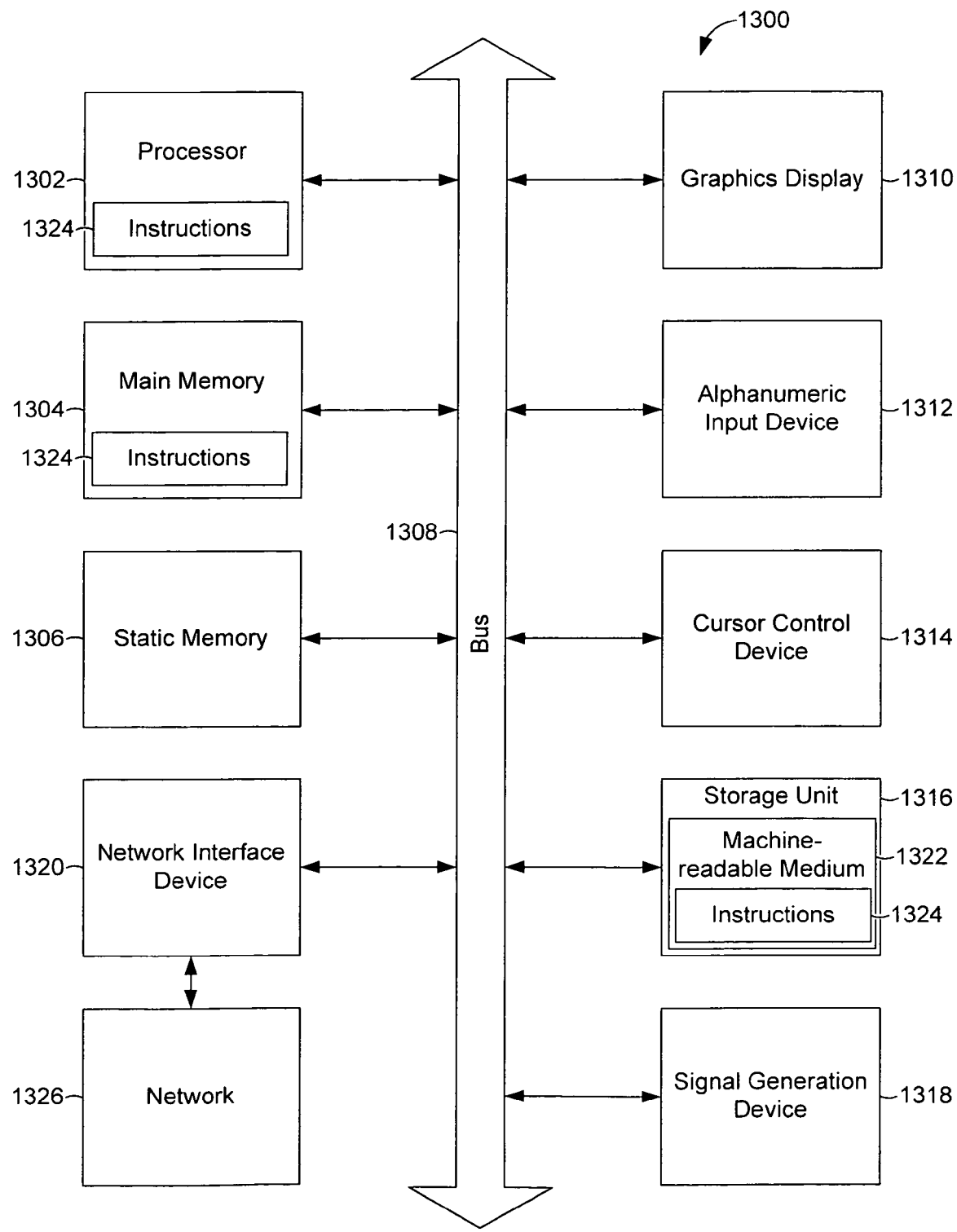
FIG. 13 is a block diagram illustrating components of a machine, according to some example embodiments, able to read instructions from a machine-readable medium and perform any one or more of the methodologies discussed herein.

FIG. 13 illustrates components of a machine 1300, according to some example embodiments, that is able to read instructions from a machine-readable medium (e.g., machine-readable storage medium) and perform any one or more of the methodologies discussed herein. Specifically, FIG. 13 shows a diagrammatic representation of the machine 1300 in the example form of a computer system and within which instructions 1324 (e.g., software) for causing the machine 1300 to perform any one or more of the methodologies discussed herein may be executed. In alternative embodiments, the machine 1300 operates as a stand-alone device or may be connected (e.g., networked) to other machines. In a networked deployment, the machine 1300 may operate in the capacity of a server machine or a client machine in a server-client network environment, or as a peer machine in a peer-to-peer (or distributed) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324 (sequentially or otherwise) that specify actions to be taken by that machine. Further, while only a single machine is illustrated, the term "machine" shall also be taken to include a collection of machines that individually or jointly execute the instructions 1324 to perform any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The machine 1300 may further include a graphics display 1310 (e.g., a plasma display panel (PDP), a liquid crystal display (LCD), a projector, or a cathode ray tube (CRT)). The machine 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored the instructions 1324 (e.g., software) embodying any one or more of the methodologies or functions described herein. The instructions 1324 may also reside, completely or at least partially, within the main memory 1304, within the processor 1302 (e.g., within the processor's cache memory), or both, during execution thereof by the machine 1300. Accordingly, the main memory 1304 and the processor 1302 may be considered as machine-readable media. The instructions 1324 may be transmitted or received over a network 1326 (e.g., network 650) via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., software) for execution by the machine, such that the instructions, when executed by one or more processors of the machine (e.g., processor 1302), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Moreover, unless specifically stated otherwise, the terms "first," "second," "third," and the like do not necessarily imply an order or sequence. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
accessing item data that corresponds to an item available for sale and inclusive of an item variable that represents information describing an attribute of the item, the item variable being a binary variable that represents an occurrence of a term in textual data descriptive of the item available for sale;
accessing a vector that is representative of a cluster of items having attributes corresponding to the attribute of the item, the vector representing a product of which the item is a specimen, the vector including a probability distribution that is pertinent to the cluster of items and represented as a plurality of probability parameters that include a probability parameter modeling the binary variable that represents the occurrence of the term in the textual data descriptive of the item available for sale;
calculating a result based on the binary variable that represents the occurrence of the term in the textual data descriptive of the item available for sale including calculating a logarithm based on the probability parameter modeling the binary variable and calculating the result based on the logarithm, the result representing a likelihood that the item is a specimen of the product represented by the cluster of items having attributes corresponding to the attribute of the item and represented by the vector, the calculating being performed by a module implemented using a processor of a machine;
determining that the item is included in the cluster based on the result; and
presenting a recommendation of the item available for sale to a potential buyer of the item, the recommendation indicating that the item is the specimen of the product represented by the cluster of items.

2. The computer-implemented method of claim 1, further comprising accessing item data that includes at least one of:
a categorical variable representing an attribute pertinent to the item;
or a continuous variable representing a number pertinent to the item.

3. The computer-implemented method of claim 1, wherein the probability distribution is selected from a group consisting of:
a binomial distribution;
a multinomial distribution; and
a Gaussian distribution.

4. The computer-implemented method of claim 1, wherein the probability parameter is selected from a group consisting of:
a Bernoulli success probability;
a multinomial parameter; and
a Gaussian mean.

5. The computer-implemented method of claim 1, wherein the calculating of the result includes calculating a sum based on the logarithm and based on the item variable.

6. The computer-implemented method of claim 1, wherein the calculating of the result includes calculating a sum based on the logarithm and not based on the item variable.

7. The computer-implemented method of claim 1 further comprising:
calculating a sum based on the result, the sum representing a total logarithmic likelihood that a plurality of items is included in the cluster;
calculating an argument of a maximum of the sum; and
estimating the vector representative of the cluster based on the argument of the maximum.

8. The computer-implemented method of claim 1, wherein the item data is generated by a seller of the item, the method further comprising receiving the item data.

9. The computer-implemented method of claim 1, wherein the item data includes at least one of a title, a description, an attribute name, an attribute value, a price, or a size of the item.

10. The computer-implemented method of claim 1 further comprising:
storing a map file that includes a correspondence between the item and the cluster; and
performing a lookup operation using the map file in response to a query pertinent to at least one of the item or the product represented by the cluster of items.

11. The computer-implemented method of claim 1 further comprising:
determining a size of the cluster of items, the size indicating a number of specimens of the product represented by the cluster;
performing a comparison of the size to a threshold; and
determining that the cluster is to be discarded based on the comparison.

12. A system comprising:
an access module, implemented using at least one hardware processor, configured to:
access item data that corresponds to an item available for sale and inclusive of an item variable that represents information describing an attribute of the item, the item variable being a binary variable that represents an occurrence of a term in textual data descriptive of the item available for sale; and
access a vector that is representative of a cluster of items having attributes corresponding to the attribute of the item, the vector representing a product of which the item is a specimen, the vector including a probability distribution that is pertinent to the cluster of items and represented as a plurality of probability parameters that include a probability parameter modeling the binary variable that represents the occurrence of the term in the textual data descriptive of the item available for sale;
a processor configured by a probability module that configures the processor to calculate a result based on the binary variable that represents the occurrence of the term in the textual data descriptive of the item available for sale including calculating a logarithm based on the probability parameter modeling the binary variable and calculating the result based on the logarithm, the result representing a likelihood that the item is a specimen of the product represented by the cluster of items having attributes corresponding to the attribute of the item and represented by the vector;
a determination module to determine that the item is included in the cluster based on the result; and
a recommendation module to present a recommendation of the item available for sale to a potential buyer of the item, the recommendation indicating that the item is the specimen of the product represented by the cluster of items.

13. The system of claim 12, wherein the probability module, in calculating the result, is to calculate a sum based on the logarithm and not based on the item variable.

14. The system of claim 12 further comprising an estimation module to calculate a sum based on the result, the sum representing a total logarithmic likelihood that a plurality of items is included in the cluster;
- calculate an argument of a maximum of the sum; and
- estimate the vector representative of the cluster based on the argument of the maximum.

15. A non-transitory machine-readable storage medium comprising instructions that, when executed by one or more processors of a machine, cause the machine to perform operations comprising:
- accessing item data that corresponds to an item available for sale and inclusive of an item variable that represents information describing an attribute of the item, the item variable being a binary variable that represents an occurrence of a term in textual data descriptive of the item available for sale;
- accessing a vector that is representative of a cluster of items having attributes corresponding to the attribute of the item, the vector representing a product of which the item is a specimen, the vector including a probability distribution that is pertinent to the cluster of items and represented as a plurality of probability parameters that include a probability parameter modeling the binary variable that represents the occurrence of the term in the textual data descriptive of the item available for sale;
- calculating a result based on the binary variable that represents the occurrence of the term in the textual data descriptive of the item available for sale including calculating a logarithm based on the probability parameter modeling the binary variable and calculating the result based on the logarithm, the result representing a likelihood that the item is a specimen of the product represented by the cluster of items having attributes corresponding to the attribute of the item and represented by the vector;
- determining that the item is included in the cluster based on the result; and
- presenting a recommendation of the item available for sale to a potential buyer of the item, the recommendation indicating that the item is the specimen of the product represented by the cluster of items.

16. The non-transitory machine-readable storage medium of claim 15, wherein:
- the calculating of the result includes calculating a sum based on the logarithm and based on the item variable; and
- the operations further comprise:
  - calculating a sum based on the result, the sum representing a total logarithmic likelihood that a plurality of items is included in the cluster;
  - calculating an argument of a maximum of the sum; and
  - estimating the vector representative of the cluster based on the argument of the maximum.

17. The non-transitory machine-readable storage medium of claim 15, wherein the operations further comprise:
- determining a size of the cluster of items, the size indicating a number of specimens of the product represented by the cluster;
- performing a comparison of the size to a threshold; and
- determining that the cluster is to be discarded based on the comparison.

* * * * *